(12) United States Patent
Walcome

(10) Patent No.: US 11,186,970 B2
(45) Date of Patent: Nov. 30, 2021

(54) ANTI-FREEZING WATER VALVE CONFIGURED FOR UNDERGROUND (BURIED) USE AND WITH OPTIONAL ANTI-SIPHON ASSEMBLY, AND WATER-VALVE ACCESSORIES

(71) Applicant: Aquor Water Systems, Incorporated, Port Townsend, WA (US)

(72) Inventor: Richard O. Walcome, Port Townsend, WA (US)

(73) Assignee: Aquor Water Systems, Incorporated, Port Townsend, WA (US)

( * ) Notice: Subject to any disclaimer, the term of this patent is extended or adjusted under 35 U.S.C. 154(b) by 187 days.

(21) Appl. No.: 15/940,647

(22) Filed: Mar. 29, 2018

(65) Prior Publication Data
US 2018/0282980 A1   Oct. 4, 2018

Related U.S. Application Data

(60) Provisional application No. 62/478,381, filed on Mar. 29, 2017, provisional application No. 62/478,384, filed on Mar. 29, 2017.

(51) Int. Cl.
*E03B 9/02* (2006.01)
*E03B 7/12* (2006.01)
(Continued)

(52) U.S. Cl.
CPC ............... *E03B 7/12* (2013.01); *A62C 35/68* (2013.01); *A62C 37/11* (2013.01); *E03B 9/025* (2013.01);
(Continued)

(58) Field of Classification Search
CPC . E03B 7/12; E03B 9/025; E03B 9/027; E03B 9/08; E03B 9/10; E03B 9/12
See application file for complete search history.

(56) References Cited

U.S. PATENT DOCUMENTS 179,092 A   6/1876  Booth et al.
846,537 A   3/1907  Whiteford
(Continued)

FOREIGN PATENT DOCUMENTS

CN   104728455 A    6/2015
DE   102015006094 A1   9/2016

OTHER PUBLICATIONS

Walcome, "Anti-Freezing Water Valve With Optional Anti-Siphon Assembly and Water-Valve Accessories", U.S. Appl. No. 15/873,867, filed Jan. 17, 2018, pp. 1-54, Published in US.
(Continued)

*Primary Examiner* — Reinaldo Sanchez-Medina
(74) *Attorney, Agent, or Firm* — Fogg & Powers LLC

(57) ABSTRACT

An embodiment of a fluid valve includes a substantially flat face plate, a receptacle, a cavity, and a drain assembly. The receptacle is disposed in the face plate and has at least one protrusion each configured to engage a respective one of at least one groove of a valve-opening-and-fluid-dispensing device. The cavity has a top end in fluid communication with the receptacle, and has a bottom end. And the drain assembly has a top end in fluid communication with the bottom end of the cavity, has a bottom end, and is configured to allow fluid to drain from the cavity in response to the valve-opening-and-fluid-dispensing device being absent from the receptacle.

21 Claims, 17 Drawing Sheets

(51) Int. Cl.
  *F16K 11/14* (2006.01)
  *F16L 37/50* (2006.01)
  *F16L 37/244* (2006.01)
  *F16L 37/48* (2006.01)
  *A62C 35/68* (2006.01)
  *A62C 37/11* (2006.01)
  *E03C 1/04* (2006.01)

(52) U.S. Cl.
  CPC .......... *F16K 11/14* (2013.01); *F16L 37/2445* (2013.01); *F16L 37/48* (2013.01); *F16L 37/505* (2013.01); *E03C 2001/0416* (2013.01)

(56) References Cited

U.S. PATENT DOCUMENTS

| | | | |
|---|---|---|---|
| 874,652 A | 12/1907 | Bailey | |
| 968,711 A | 8/1910 | Stevenson | |
| 1,067,583 A | 7/1913 | Brague | |
| 1,263,792 A | 4/1918 | Mueller | |
| 1,788,449 A | 1/1931 | Catlin | |
| 2,034,933 A * | 3/1936 | Wilson | F16L 37/252 137/322 |
| 2,292,674 A * | 8/1942 | Terrell | E03B 9/08 137/285 |
| 2,630,131 A | 3/1953 | Snyder | |
| 3,106,935 A | 10/1963 | Gatzke | |
| 3,199,831 A * | 8/1965 | Sully | E03B 9/08 251/149.6 |
| 3,494,373 A | 2/1970 | Horak et al. | |
| 3,589,615 A * | 6/1971 | Cummins | B05B 15/65 239/201 |
| 4,112,966 A | 9/1978 | Carlson | |
| 4,178,956 A | 12/1979 | Fillman | |
| 4,298,166 A * | 11/1981 | White | A01G 25/00 137/322 |
| 4,473,244 A | 9/1984 | Hill | |
| 4,644,970 A | 2/1987 | Lowry | |
| 4,700,732 A | 10/1987 | Francisco | |
| 4,844,116 A | 7/1989 | Buehler et al. | |
| 4,909,270 A | 3/1990 | Enterante, Sr. et al. | |
| 4,971,097 A | 11/1990 | Hunley, Jr. et al. | |
| 5,029,603 A | 7/1991 | Ackroyd | |
| 5,158,105 A | 10/1992 | Conway | |
| 5,372,158 A | 12/1994 | Berfield | |
| 5,533,546 A | 7/1996 | Dixon | |
| 5,740,831 A | 4/1998 | DeNardo et al. | |
| 5,765,816 A | 6/1998 | Chrysler | |
| 5,836,397 A | 11/1998 | Craig et al. | |
| 6,024,175 A | 2/2000 | Moore, Jr. et al. | |
| 6,250,688 B1 | 6/2001 | Kirby | |
| 6,394,132 B1 | 5/2002 | Walcome | |
| 6,450,264 B1 | 9/2002 | Christian | |
| 6,536,534 B1 | 3/2003 | Sundholm | |
| 6,644,340 B2 | 11/2003 | Rokkjaer | |
| 6,752,167 B1 | 6/2004 | Stanaland et al. | |
| 6,808,127 B2 | 10/2004 | Mcnulty et al. | |
| 7,331,399 B2 | 2/2008 | Multer | |
| 2002/0040732 A1 | 4/2002 | King, Jr. | |
| 2006/0042693 A1 | 3/2006 | Holland et al. | |
| 2006/0201553 A1 | 9/2006 | Poskin et al. | |
| 2006/0255658 A1 | 11/2006 | Klee | |
| 2007/0056631 A1* | 3/2007 | Seppmann | F16K 27/006 137/294 |
| 2007/0246567 A1 | 10/2007 | Roberts | |
| 2008/0115835 A1 | 5/2008 | Wu | |
| 2008/0245418 A1 | 10/2008 | Lawson | |
| 2010/0096028 A1 | 4/2010 | Qiu | |
| 2014/0144520 A1 | 5/2014 | Marchand | |
| 2014/0262359 A1 | 9/2014 | Poncia et al. | |
| 2016/0225895 A1 | 8/2016 | He et al. | |
| 2016/0327164 A1 | 11/2016 | Tyers | |
| 2017/0326391 A1 | 11/2017 | Briscoe et al. | |
| 2018/0179741 A1 | 6/2018 | Kim | |
| 2018/0202133 A1 | 7/2018 | Walcome | |

OTHER PUBLICATIONS

Walcome, "Fire-Suppression Water-Intake Valve, Fire-Suppression Sprinkler Head Configured for Rapid Installation in, and Rapid Removal From, the Water-Intake Valve Without the Need to Interrupt the Water Supply, and Related Systems and Methods", "US Application filed on Mar. 29, 2018", pp. 1-47, Published in: US.

International Searching Authority; Notification of Transmittal of the International Search Report and the Written Opinion of the International Searching Authority, or the Declaration from PCT Application No. PCT/US2018/014112 dated May 7, 2018; from Foreign Counterpart of U.S. Appl. No. 15/873,867; dated May 7, 2018; pp. 1-20; Published: PCT.

International Searching Authority; "Notification of Transmittal of the International Search Report and the Written Opinion of the International Searching Authority" from PCT Application No. PCT/US2018/025271 dated Jun. 22, 2018; from Foreign Counterpart of U.S. Appl. No. 15/940,664; pp. 1-15; dated Jun. 22, 2018; Published: US.

International Bureau, "International Preliminary Report on Patentability from PCT Application No. PCT/US2018/025269 dated Oct. 10, 2019", from Foreign Counterpart to U.S. Appl. No. 15/940,647, pp. 1-8, Published: WO.

International Bureau, "International Preliminary Report on Patentability from PCT Application No. PCT/US2018/025271 dated Oct. 10, 2019", from Foreign Counterpart to U.S. Appl. No. 15/940,664, pp. 1-9, Published: WO.

International Bureau, "International Preliminary Report on Patentability from PCT Application No. PCT/US2018/014112 dated Aug. 1, 2019", from Foreign Counterpart to U.S. Appl. No. 15/873,867, pp. 1-12, Published: WO.

U.S. Patent and Trademark Office, "Office Action", U.S. Appl. No. 15/873,867, dated Sep. 16, 2019, pp. 1-47, Published: US.

International Searching Authority; "Notification of the International Search Report and the Written Opinion of the International Searching Authority, or the Declaration from PCT Application No. PCT/US2018/025269 dated Aug. 8, 2018"; from Foreign Counterpart of U.S. Appl. No. 15/940,647; pp. 1-15; dated Aug. 8, 2018; Published US.

U.S. Patent and Trademark Office, "Final Office Action", U.S. Appl. No. 15/873,867, dated Apr. 16, 2020, pp. 1 through 35, Published: US.

U.S. Patent and Trademark Office, "Office Action", U.S. Appl. No. 15/940,664, dated Dec. 2, 19, pp. 1-36, Published: US.

U.S. Patent and Trademark Office, "Restriction Requirement", U.S. Appl. No. 15/940,664, dated Jul. 1, 2019, pp. 1-9, Published: US.

U.S. Patent and Trademark Office, "Advisory Action", U.S. Appl. No. 15/940,664, dated Nov. 3, 2020, pp. 1 through 4, Published: US.

U.S. Patent and Trademark Office, "Final Office Action", U.S. Appl. No. 15/940,664, dated Jul. 22, 2020, pp. 1 through 26, Published: US.

U.S. Patent and Trademark Office, "Advisory Action", U.S. Appl. No. 15/873,867, dated Aug. 21, 2020, pp. 1 through 8, Published: US.

U.S. Patent and Trademark Office, "Office Action", U.S. Appl. No. 15/873,867, dated Nov. 30, 2020, pp. 1 through 21, Published: US.

U.S. Patent and Trademark Office, "Notice of Allowance", U.S. Appl. No. 15/873,867, dated May 28, 2021, pp. 1 through 16, Published: US.

U.S. Patent and Trademark Office, "Office Action", U.S. Appl. No. 15/940,664, dated Mar. 4, 2021, pp. 1 through 29, Published: US.

U.S. Patent and Trademark Office, "Notice of Allowance", U.S. Appl. No. 15/873,867, dated Oct. 6, 2021, pp. 1-11, Published: US.

* cited by examiner

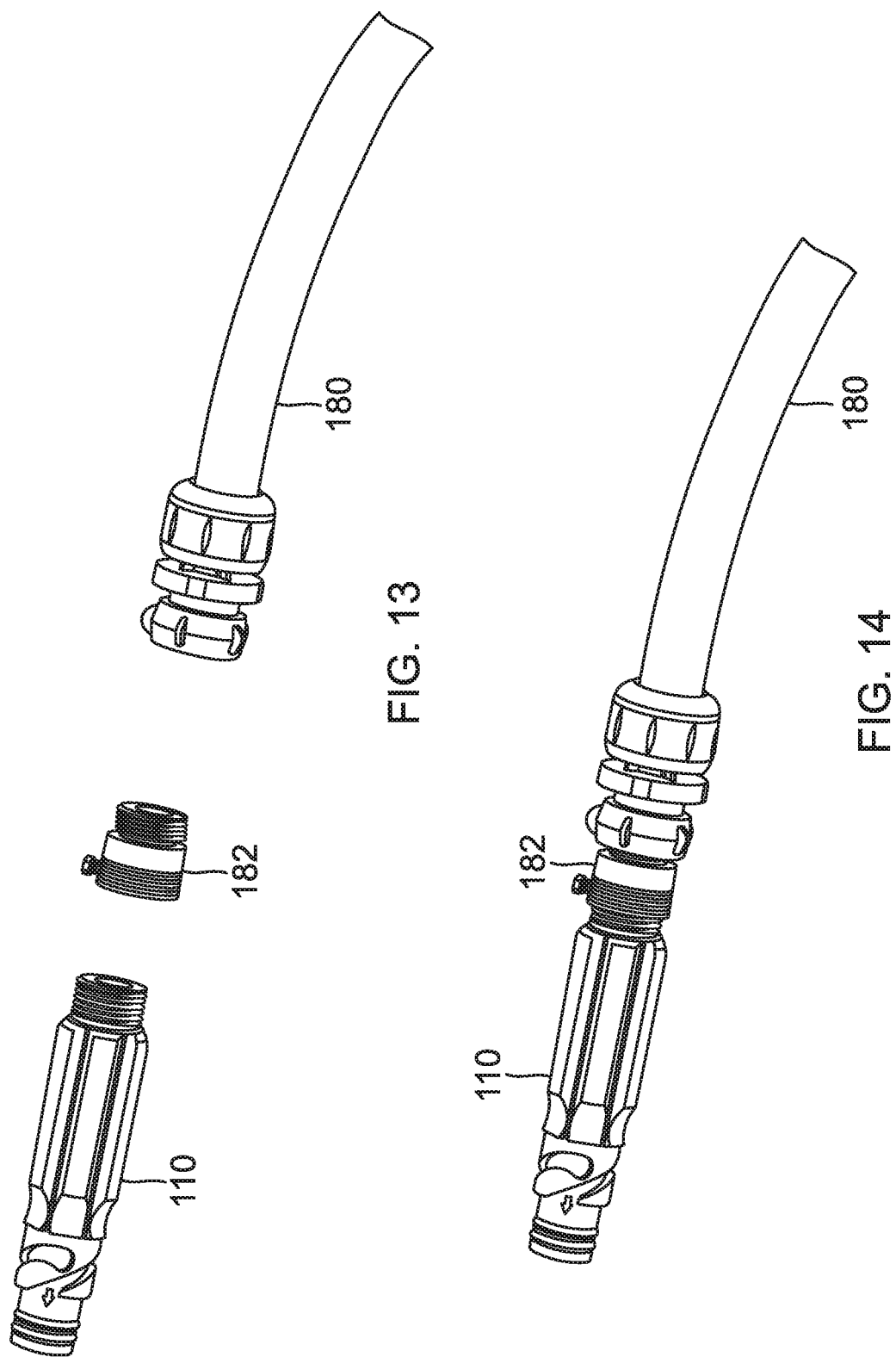

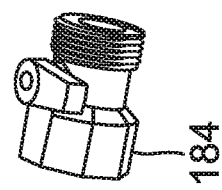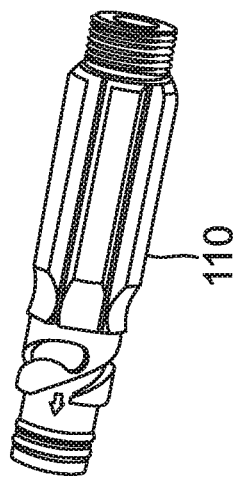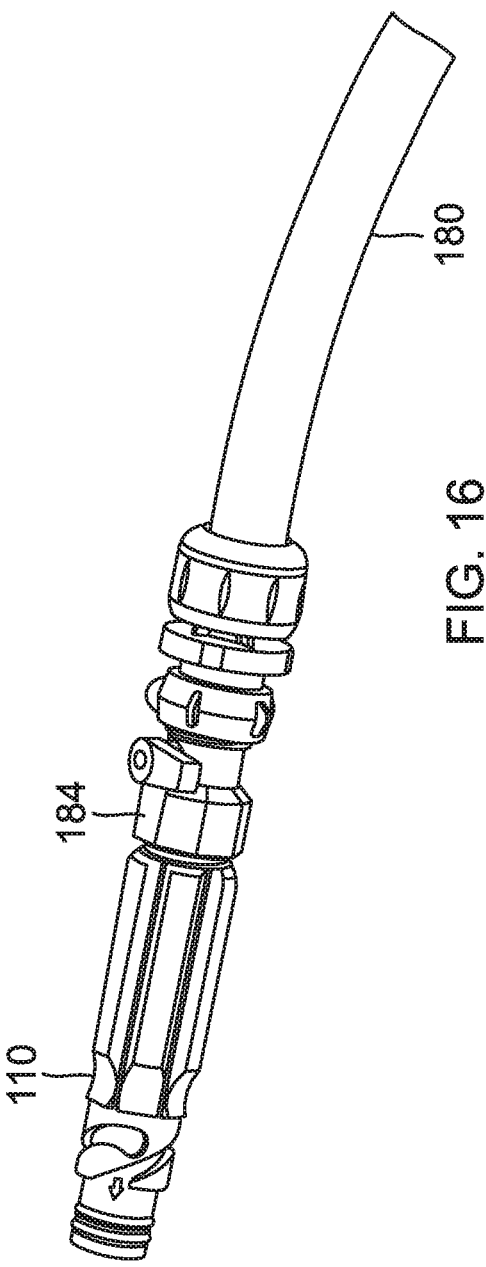
FIG. 15
FIG. 16

ANTI-FREEZING WATER VALVE CONFIGURED FOR UNDERGROUND (BURIED) USE AND WITH OPTIONAL ANTI-SIPHON ASSEMBLY, AND WATER-VALVE ACCESSORIES

PRIORITY CLAIM AND CROSS-RELATED APPLICATIONS

This application claims benefit of priority to the following U.S. patent applications, which are incorporated by reference: U.S. Provisional Patent Application Ser. No. 62/478,381, entitled "ANTI-FREEZING WATER VALVE CONFIGURED FOR UNDERGROUND (BURIED) USE AND WITH OPTIONAL ANTI-SIPHON ASSEMBLY," filed 29 Mar. 2017; and U.S. Provisional Patent Application Ser. No. 62/478,384, entitled "FIRE SUPPRESSION SPRINKLER ASSEMBLY INCLUDING A SPRINKLER HEAD CONFIGURED FOR RAPID INSTALLATION AND REPLACEMENT WITHOUT THE NEED TO INTERRUPT THE WATER SUPPLY," filed 29 Mar. 2017.

This application is related to the following U.S. Patent Applications, which are incorporated by reference: U.S. Utility patent application Ser. No. 15/873,867, entitled "Anti-Freezing Water Valve With Optional Anti-Siphon Assembly And Water-Valve Accessories," filed 17 Jan. 2018; and U.S. Utility patent application Ser. No. 15/940,664, entitled "Fire-Suppression Water-Intake Valve, Fire-Suppression Sprinkler Head Configured For Rapid Installation In, And Rapid Removal From, The Water-Intake Valve Without The Need To Interrupt The Water Supply, And Related Systems And Methods," filed Mar. 29, 2018.

SUMMARY

An embodiment of an anti-freezing water valve for underground use (e.g., a yard of a residential home, the grounds of a commercial entity such as a golf course) includes a water cavity, a coupling, a face-plate assembly, a cover assembly, a receptacle, and a valve assembly. The coupling is removably and rotatably attachable to a rear end of the water cavity, the face-plate assembly is attachable to a front end of the water cavity, and the cover assembly is attachable to the face-plate assembly. The receptacle is disposed in the face-plate assembly and is configured to receive a water handle or other valve-opening device. And the valve assembly is disposed inside of the water cavity and is configured to enable water flow when the water handle is installed in the receptacle, and to disable water flow when the water handle is removed from the receptacle.

Such a water valve has one or more advantages as compared to a conventional water faucet. Because the water valve has no integral faucet or spigot, the face-plate assembly can be mounted flush, or beneath, the level of the ground or other surface through which the water valve extends. Such below-level and flush mountings can be aesthetically pleasing, and can reduce or eliminate injuries and other damages due to a person or object tripping over a conventional ground-mounted faucet or spigot, and can also eliminate the inconvenience of a person reaching into a below-ground chamber to operate a faucet. Furthermore, the absence of a faucet or spigot can deter or prevent unauthorized water usage. Moreover, the coupling to a facility's water system can be configured to allow rotation of the water valve for easy orientation of the face-plate assembly without the need to disconnect and reinstall the water valve.

In another embodiment, the water valve further includes an anti-siphon assembly that is configured to reduce or eliminate water leakage while water within the water cavity exhibits a positive water pressure or a negative water pressure relative to a water pressure in a hose or other conduit connected to the water valve, and that is configured to allow an anti-siphon tube to drain when the water handle is disconnected from the receptacle.

Another embodiment relates to an anti-freezing rapid water-intake valve that has simple structure and that is composed of a water-intake handle with a water outlet, a water-intake valve body with a water inlet, and a valve-body drain, wherein the water-intake valve body is internally provided with a water valve, the water-intake handle is simply spliced with the water-intake valve body to realize smooth water flow; the valve-body drain is configured so that when the water-intake handle is pulled out, the residual water in the water-intake valve body will automatically drain out via the drain; an internal valve of the water-intake valve body is used for isolating the tap water at an anti-freezing position, and the distance can be determined according to specific anti-freezing requirements in order to ensure that the pipe is not frozen or cracked in cold winter, thus facilitating users and saving water resources; the water-intake valve body is also provided with a one-way valve, and the one-way valve is closed during water supply, but once the water-supply pipe is decompressed, the one-way valve will be automatically opened to introduce air into the valve-body cavity to avoid a siphonic effect and accordingly prevent waste water from being reversely sucked into the water-supply pipe.

Another embodiment relates to an anti-siphon anti-freezing rapid water-intake valve which has simple structure and is composed of a water-intake handle with a water outlet and a water-intake valve body with a water inlet, wherein the water-intake valve body is internally provided with a water valve, the water-intake handle is simply spliced with the water-intake valve body to realize smooth water flow; the valve body can be partially or fully buried underground, and can include a drain assembly so that when the water-intake handle is pulled out, the residual water in the water-intake valve body will automatically flow out via the drain assembly; an internal valve of the water-intake valve body is used for isolating the tap water at an anti-freezing position, and the distance can be determined according to specific anti-freezing requirements in order to ensure that the pipe is not frozen or cracked in cold winter, thus facilitating users and saving water resources; the water-intake valve body is also provided with a one-way valve, and the one-way valve is closed during water supply, but once the water supply pipe is decompressed, the one-way valve will be automatically opened to introduce air into the valve body cavity to avoid siphonic effect and accordingly prevent waste water from being reversely sucked into the water-supply pipe.

Another embodiment is a fluid valve including a substantially flat face plate, a receptacle, a cavity, and a drain assembly. The receptacle is disposed in the face plate and has at least one protrusion each configured to engage a respective one of at least one groove of a valve-opening-and-fluid-dispensing device. The cavity has a top end in fluid communication with the receptacle, and has a bottom end. And the drain assembly has a top end in fluid communication with the bottom end of the cavity, has a bottom end, and is configured to allow fluid to drain from the cavity in response to the valve-opening-and-fluid-dispensing device being absent from the receptacle.

Such a drain assembly can prevent freezing damage to the valve by allowing a liquid, for example, water, to drain form the cavity even where the cavity is upright, such as where the fluid valve is installed underground.

Another embodiment is a fluid valve having a substantially flat face plate, a receptacle, a cavity, and a drain assembly. The receptacle is disposed in the face plate and has at least one protrusion each configured to engage a respective one of at least one groove of a valve-opening-and-fluid-dispensing device. The cavity has a top end in fluid communication with the receptacle, and has a bottom end. And the drain assembly has a top end in fluid communication with the bottom end of the cavity, has a bottom end including a sealing surface, has a drain output, has a sealing ball, has a first sealing ring, and is configured to break a drain seal between the drain output and the cavity by urging the sealing ball away from the first sealing ring with a drain-opening force that is greater than an opposing drain-closing force.

Such a drain assembly can prevent freezing damage to the valve by allowing a liquid, for example, water, to drain form the cavity even where the cavity is upright, such as where the fluid valve is installed underground.

BRIEF DESCRIPTION OF THE DRAWINGS

FIGS. 13-14 are an exploded isometric view and an unexploded isometric view, respectively, of the water handle of FIGS. 5-7 attached to a hose via an optional vacuum breaker, according to an embodiment.

FIGS. 15-16 are an exploded isometric view and an unexploded isometric view, respectively, of the water handle of FIGS. 5-7 attached to a hose via an optional valve switch, according to an embodiment.

DETAILED DESCRIPTION

In the following description, "approximate," "approximately," "about," and "substantially," mean that a quantity (e.g., a length) can vary from a given value (e.g., 10 feet) by up to ±20% (e.g., ±20% of 10 feet=2 feet, which means an "approximate" value of 10 feet can range from 10−2=8 feet to 10+2=12 feet. Furthermore, an "approximately" or a "substantially" horizontal surface means a surface (or a plane to which the horizontal surface is fit if the surface is not perfectly flat) that has an angle $-20° \leq \alpha \leq +20°$ relative to a flat and horizontal surface.

Figure 1:
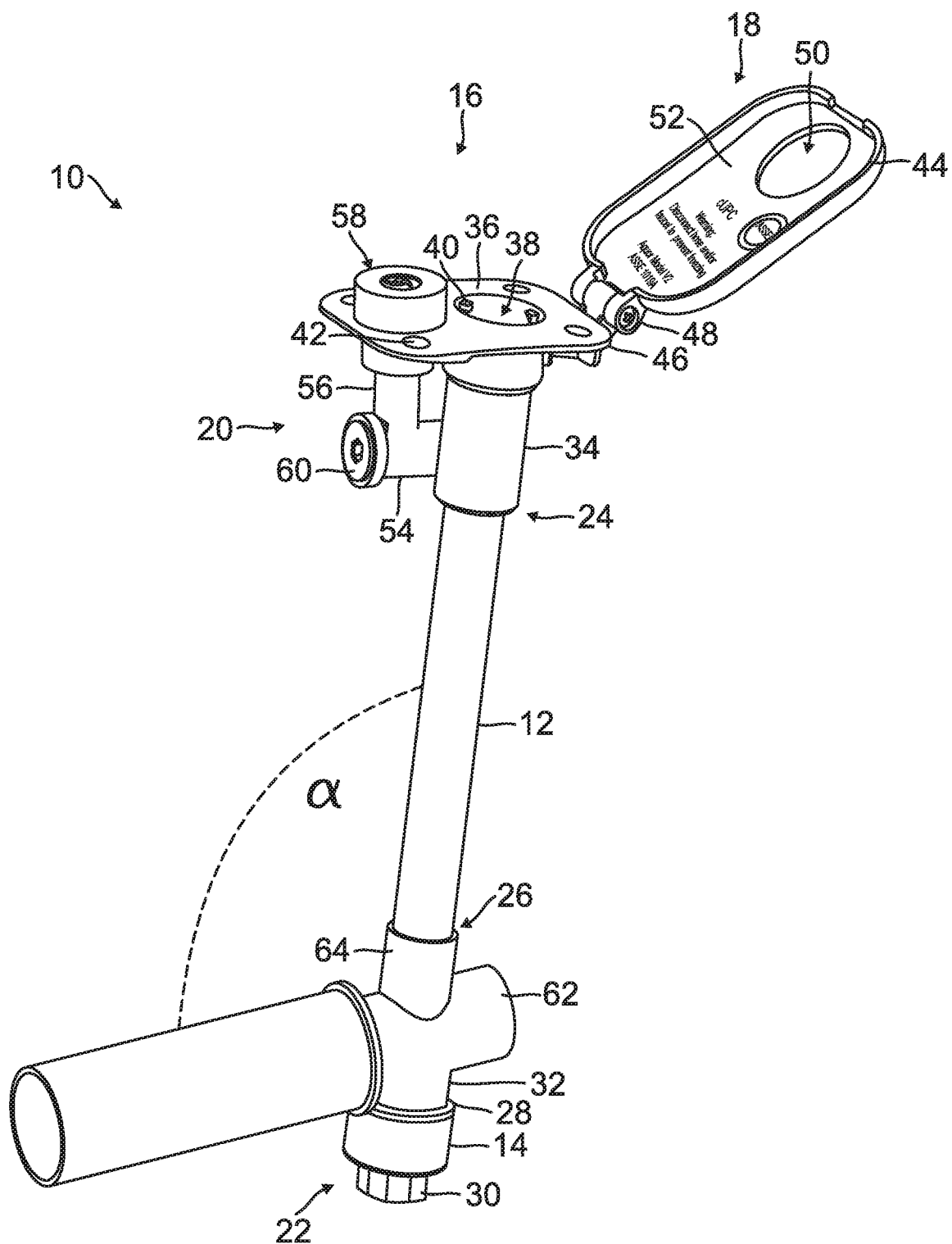
FIG. 1 is an isometric view of an anti-freeze, anti-siphon water valve for underground use, according to an embodiment.

FIG. 1 is an isometric view of an anti-freeze, anti-siphon water valve 10 for underground or under-surface use, or other ground-based or surface-based uses, according to an embodiment. In a typical application, the water valve 10 is installed (e.g., buried) in an underground or under-surface chamber (see FIG. 2) in a lawn, patio, parking area, side walk, golf course, ship deck, pool deck, or other ground-based surface or non-ground-based surface (not shown in FIG. 1) to provide a source of water for, e.g., watering a lawn, garden, or crop, filling a swimming pool or spa, washing a vehicle, boat, or other object, or filling a bucket or other tank. As described below, the water valve 10 is configured for time-saving installation and removal, freeze prevention, and siphon prevention, and for providing a substantially flat profile and a substantially flat interface for water-sourcing equipment such as a garden hose. The substantially flat profile allows mounting the water valve 10 such that it is flush with, or offset below, the level of the ground or other surface beneath which the water valve is installed.

The water valve 10 includes a water cavity 12, a threaded connector (herein after "coupler") 14, a face-plate assembly 16, a cover assembly 18, an anti-siphon assembly 20, and a freeze-prevention drain assembly 22. The water valve 10 also includes a valve assembly (not shown in FIG. 1) that is described below in conjunction with FIGS. 3-4 and 7.

The water cavity 12 is a hollow tube having a top end 24 and a bottom end 26. The top end 24 is a male end that is configured for attachment to the face-plate assembly 16 by, e.g., welding, and the bottom end 26 is a male end that is configured attachment to the drain assembly 22 by, e.g., welding. The water cavity 12 can be made from any suitable material such as a metal (e.g., stainless steel) or a polymer (e.g., polyvinyl chloride (PVC)). As described below, the water cavity 12 is configured to provide a thermal barrier between the environment above the ground chamber in which the water valve 10 is installed and the water-supply-and-distribution system (not shown in FIG. 1) that feeds the water valve to prevent freezing of water within the water-supply-and-distribution system and within the water valve itself. Depending on the temperatures to which the water valve 10 is expected to be exposed, the length of the water cavity 12 can be adjusted to virtually any length suitable to provide a desired level of freeze protection. For example, the water cavity 12 can have lengths of approximately four inches, six inches, eight inches, twelve inches, and fourteen inches.

The threaded coupler 14 is configured to allow leak-proof coupling of the water valve 10 to a water pipe, or other water conduit, of a water-supply-and-distribution system (not shown in FIG. 1). The coupler 14 includes a top end 28 and a bottom end 30. The top end 28 is a threaded female end configured for engaging a threaded male bottom end 32 of the drain assembly 22, and the bottom end 30 is a threaded female end configured to engage a male end of a pipe, other conduit, or connector of the water-supply-and-distribution system. As described below in conjunction with FIGS. 3 and 4, the coupler 14 is configured to allow a plumber or other installer to rotate the face-plate assembly 16 relative to the top end 28 of the coupler so as to easily and quickly place the face-plate assembly into a desired orientation relative to a ground surface, other surface, or other reference. Furthermore, although, like the water cavity 12, the coupler 14 can be made from any suitable material such as a metal (e.g., stainless steel) or a polymer (e.g., polyvinyl chloride (PVC)), the coupler is typically made from the same material as the water cavity and the drain assembly 22.

The face-plate assembly 16 includes a bottom end 34, a face plate 36, a receptacle 38 disposed in the face plate 36 and in fluid communication with the bottom end 34, engagement protrusions (sometimes called "salient points") 40 approximately evenly distributed around an inner wall of the receptacle, and mounting holes 42. The bottom end 34 is a female connector that is configured for attachment to the top end 24 of the water cavity 12 by threading, adhesive, or welding. The face plate 36 is configured to protrude from an opening in a ground-based surface, or other surface, when the water valve 10 is installed in the underground or under-surface chamber, and is configured to cover the opening in an aesthetically pleasing manner. The receptacle 38 is configured to receive an attachment, such as a water handle or other water connector (not shown in FIG. 1), that, when installed in the receptacle, opens the water valve 10 such that water flows from the water-supply-and-distribution system, through the coupler 14, the drain assembly 22, the water cavity 12, the face-plate assembly's top end 34, and out from the receptacle. And the engagement protrusions 40 are configured to engage the attachment and to allow one to install the attachment in the receptacle 38 and to remove the attachment from the receptacle. Like the water cavity 12, the face-plate assembly 16 can be made from any suitable material such as a metal (e.g., stainless steel) or a polymer (e.g., PVC), but is typically made from the same material as the water cavity.

The cover assembly 18 includes a cover 44, which is attached to an end 46 of the face plate 36 with a hinge 48, and is configured to cover the face plate and the receptacle 38 while the water valve 10 is closed and not in use. Furthermore, the cover 44 can include an opening 50 configured to fit over an exposed portion of the anti-siphon assembly 20 while the cover is closed. Moreover, information, such as the serial number, model number, and information regarding approval of the water valve 10 by an industry-standards body, can be printed on, engraved in, or otherwise attached to, an inner surface 52 of the cover 44. In addition, particularly where the water valve 10 is installed in a surface other than a ground-based surface, there may be insulation or another suitable sealing material (not shown in FIG. 1) disposed behind the face plate 36 to seal, thermally and fluidly, the opening in the surface through which the water valve extends. And like the water cavity 12, the cover assembly 18 can be made from any suitable material such as a metal (e.g., stainless steel) or a polymer (e.g., PVC), and can be made from one material (e.g., PVC) even when the face-plate assembly 16 is made from another material (e.g., stainless steel).

The anti-siphon assembly 20 includes respective horizontal and vertical hollow tubes 54 and 56, which are formed integrally with the face-plate assembly 16, an anti-siphon valve assembly 58, and an optional threaded drain plug 60. As described below in conjunction with FIGS. 8-9, the anti-siphon assembly 20 is configured to prevent water, or another substance, from entering a water-supply-and-distribution system via the water valve 10, and is also configured to allow water to drain from the tubes 54 and 56 while the water valve is closed.

The anti-freeze drain assembly 22 includes a horizontal body 62, which is located between the water cavity 12 and the coupler 14, and which is configured to be angled downward by an angle α (e.g., ~95°≤α≤~105° while the face plate 36 is level. As described below in conjunction with FIGS. 10-12, while the water valve 10 is closed, the drain assembly 22 is configured to allow water to drain from the water cavity 12, and from the tubes 54 and 56 if the anti-siphon assembly 20 is present. In addition to the bottom end 32, the horizontal body 62 includes a top end 64 configured for coupling to the bottom end 26 of the water cavity 12. The top end 64 is, for example, a female connector configured for coupling to the bottom end 26 by threads, welding, or another type of coupling. Furthermore, the horizontal body 62 can be made from any suitable material, such as metal (e.g., stainless steel) or plastic (e.g., PVC), although it is typically made from the same material from which the water cavity 12 is made.

Still referring to FIG. 1, alternate embodiments of the water valve 10 are contemplated. For example, the ends 24, 26, 28, 30, 32, 34, and 64 can be of types other than respectively described. Examples of such other types of ends include male and female threaded ends, male and female ends configured for welding or adhering with an adhesive, and male and female ends configured for crimp connecting. Furthermore, the anti-siphon assembly 20 can be omitted from the water valve 10. Moreover, the hinge 48 can be disposed at any suitable location around a periphery of the face plate 36.

Figure 2:
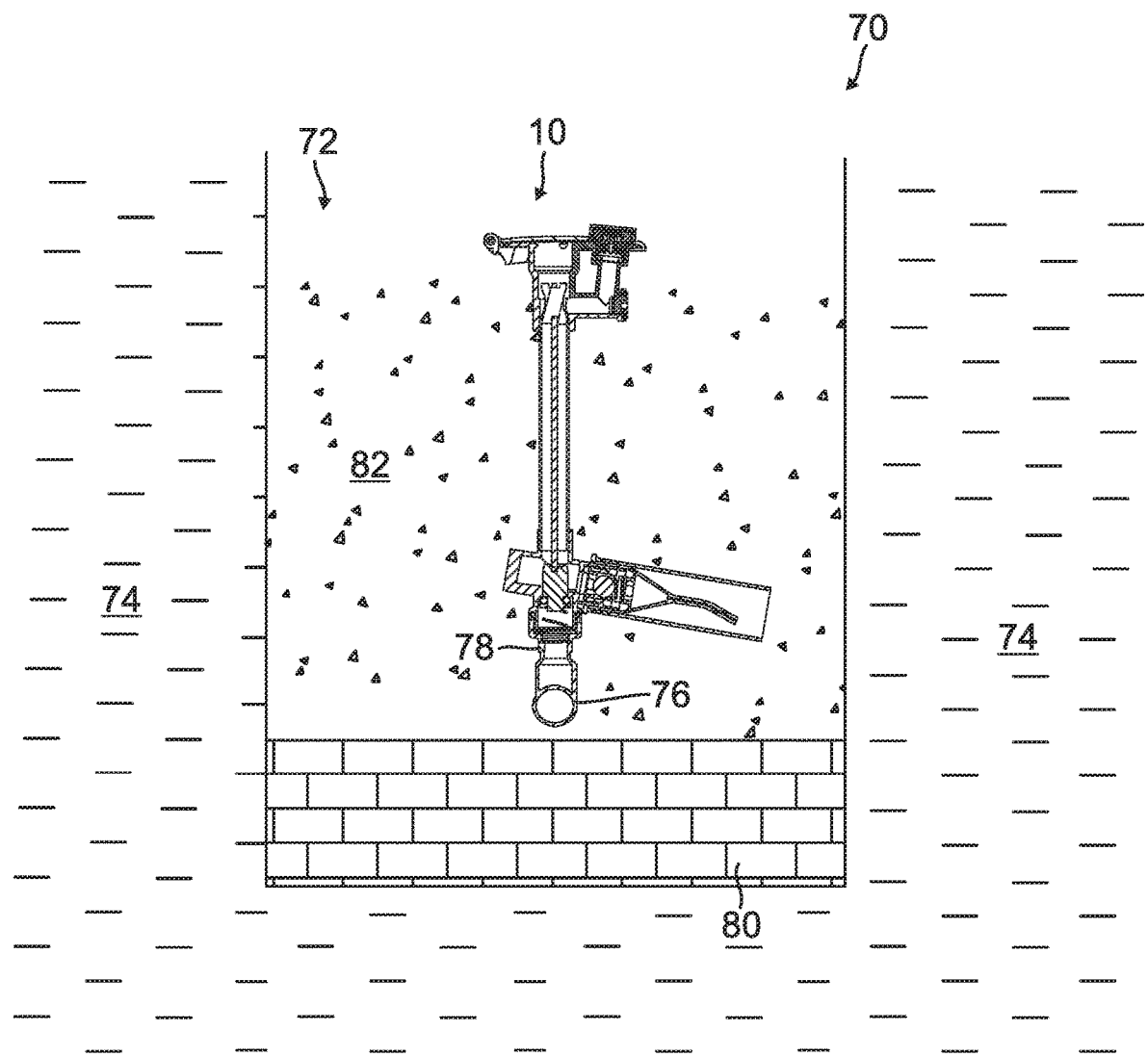
FIG. 2 is a side view of the water valve of FIG. 1 installed in a ground chamber, according to an embodiment.

FIG. 2 is a side view, with portions broken away, of an installation 70 of the water valve 10 of FIG. 1 in a chamber 72 formed in the ground 74 (or other environment), according to an embodiment. The installation 70 includes a water pipe 76 (the water-flow dimension is normal to the page of FIG. 2) and a fitting 78 of a water-supply-and-distribution system, and the chamber 72 includes a base 80 and a support-and-drain field 82.

Figure 3:
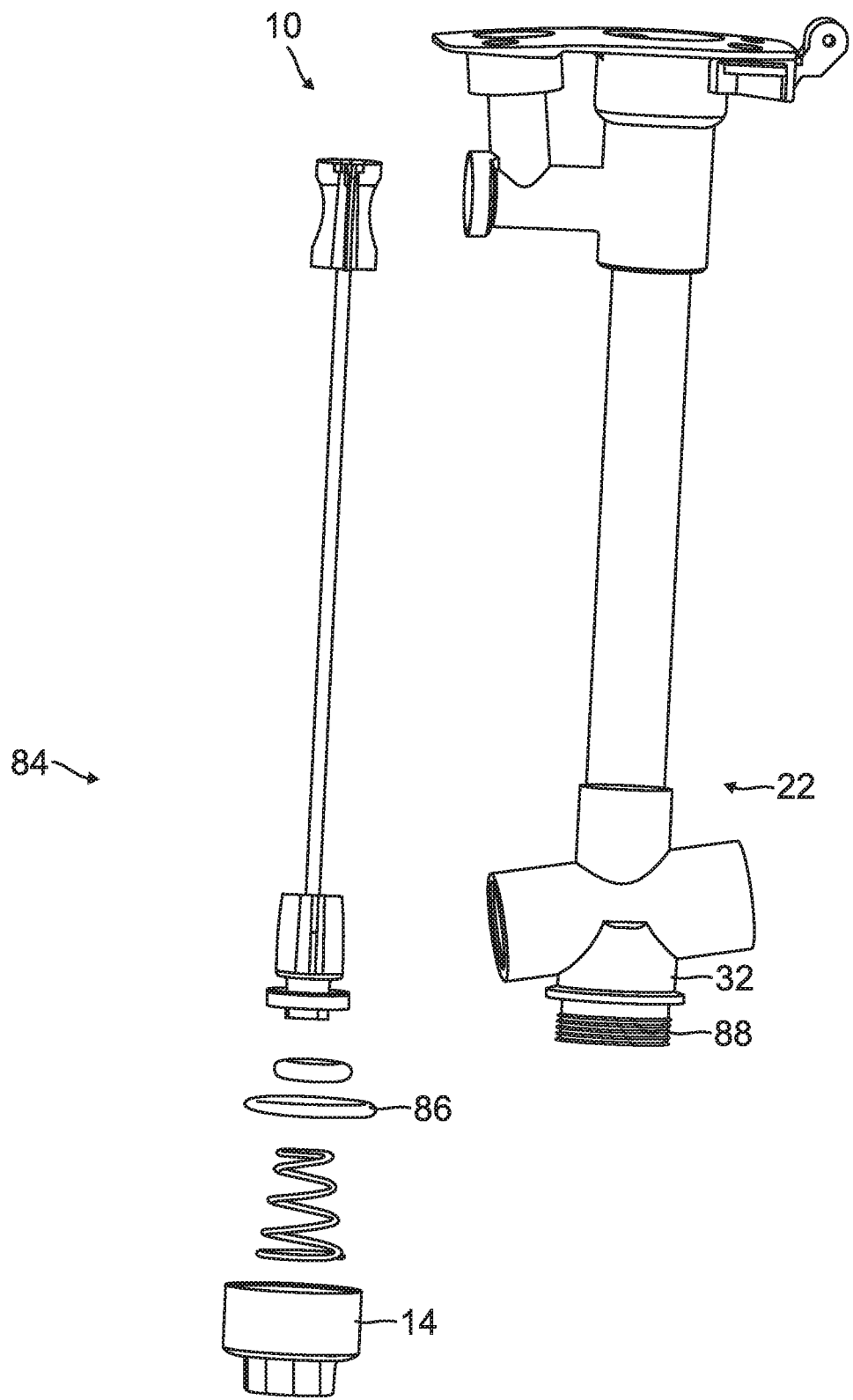
FIG. 3 is a side view of the water valve of FIGS. 1-2 with a valve assembly exploded from inside of the water valve, according to an embodiment.

FIG. 3 is a side view of the water valve 10 of FIGS. 1-2 with the connector 14 and a valve assembly 84 exploded from the drain assembly 22 and the water cavity 12, respectively, according to an embodiment. A seal (e.g., an O-ring) 86 is configured to fit over threads 88 of the bottom end 32 of the drain assembly 22, and to form a seal while the connector 14 tightly engages the threads 88. The valve assembly 84 is described below in conjunction with FIG. 4.

Referring to FIGS. 1-3, procedures for forming the chamber 72 and for installing the water valve 10 in the chamber are described, according to an embodiment. For purposes of example, it is assumed that at least the water pipe 76 and the fitting 78 of the water-supply-and-distribution system are installed under the ground 74 before the formation of the chamber 72 and, therefore, before the installation of the water valve 10 within the chamber.

To form the chamber 72, an installer (not shown in FIGS. 1-3) first forms a hole in the ground 74 such that the hole exposes the fitting 78 and extends a suitable distance (e.g., approximately four inches, six inches, eighth inches, twelve inches, fourteen inches, or more) below the water pipe 76.

Then, the installer forms the base 80 from any suitable material such as water-permeable brick or pavers. Alternatively, the base 80 may have already been formed when the water-supply-and-distribution system was installed. The base 80 provides support for the water valve 10, acts to prevent a downward force applied to the water valve (e.g., when installing a water handle in the receptacle 38) from stressing or damaging the water pipe 76, and allows the draining of water, or other liquid, that enters the chamber 72 (e.g., due to rain, water draining from the drain assembly 22, and water dripping from a hose attached to the water valve) to the ground 74 (or other region) below the base.

Next, the installer turns off the water supply to the water pipe 76.

Then, the installer rotates the water valve 10 to screw the bottom end 30 (FIG. 1) of the coupler 14 onto the fitting 78. Before screwing the bottom end 30 of the coupler 14 onto the fitting 78, the installer may apply a sealant, such as Teflon® tape or plumber's paste, onto the threads of one or both of the bottom end 30 and the fitting 78.

Next, the installer determines if the face plate 36 is in a desired orientation relative to any reference such as the ground or a building within sight of the chamber 72.

If the installer were to determine that the face plate 36 does not have a desired orientation, and the coupling between the top end 28 of the coupler 14 and the bottom end 32 of the drain assembly 22 were conventional, then the installer would need to unscrew the bottom end 30 of the connector 14 from the fitting 78, and apply Teflon® tape (or more tape or less tape if some is already applied) or another material to the threads of the bottom end 30 of the connector 14 so as to change the "all-the-way" rotational position (the position in which the bottom end 30 stops rotating relative to the fitting 78) to a position that provides the desired orientation of the face plate 36. This conventional procedure often requires multiple, trial-and-error attempts that cause the face plate 36 to approach, gradually, the desired orientation; therefore, this conventional procedure can take a significant amount of the installer's time (e.g., approximately fifteen minutes to one hour) during which he/she could be performing other tasks.

But, referring to FIG. 3, due to the unique design of the bottom end 32 of the drain assembly 22, if the installer cannot position the face plate 36 in a desired orientation, then he/she simply rotates the water cavity 12, and thus the drain assembly 22, relative to the top end 28 of the coupler 14 until the face plate 36 has a desired orientation. Even if the threads 88 of the bottom end 32 are not screwed "all the way" into the top end 28 of the coupler 14, the O-ring 86 prevents water from leaking at the junction of the drain assembly 22 and the coupler. For example, the O-ring 86 is positioned, and otherwise configured, so as to allow an installer to rotate the water cavity 10, and thus the face plate 36, up to 360° back from the all-the-way position while still maintaining a leak-proof seal. Consequently, the installer can position the face plate 36 in any desired orientation by screwing the bottom end 32 of the water cavity 12 all the way into the top end 28 of the coupler 14, and then "backing out" (i.e., unscrewing) the bottom end 32 until the face plate 36 has the desired orientation relative to the top opening of the chamber 72 (or relative to any other reference point).

After the installer orients the face plate 36 as desired, he/she fills the chamber 72 with fill material (e.g., gravel, crushed stone) to form the support-and-drain region 82, which provides side-to-side support of the water valve 10, and which allows the draining of water, or other liquid, that enters the chamber to and through the base 80. The installer may fill the chamber 72 all the way to its top such that the region 82 is level with the ground 74 (or other surface), or the installer may leave an unfilled top portion of the chamber such that the top surface formed by the fill material is offset from the ground (or other surface).

Then, the installer can reestablish water pressure to the water pipe 76 and check the installation 70 for leaks and for proper operation of the water valve 10.

Still referring to FIGS. 1-3, alternate embodiments of the above-described chamber-forming and water-valve-installation procedures are contemplated. For example, one or more of the above steps can be performed in an order different than described, one or more of the above steps can be omitted, and one or more other steps can be added. Furthermore, the water valve assembly 10 can be installed such that the face plate 36 or cover 44, when closed, is flush with the surface of the ground 74 (or the surface of another region in which the water valve 10 is installed), or is recessed below the surface of the ground (or other region) as shown in FIG. 2.

Figure 4:
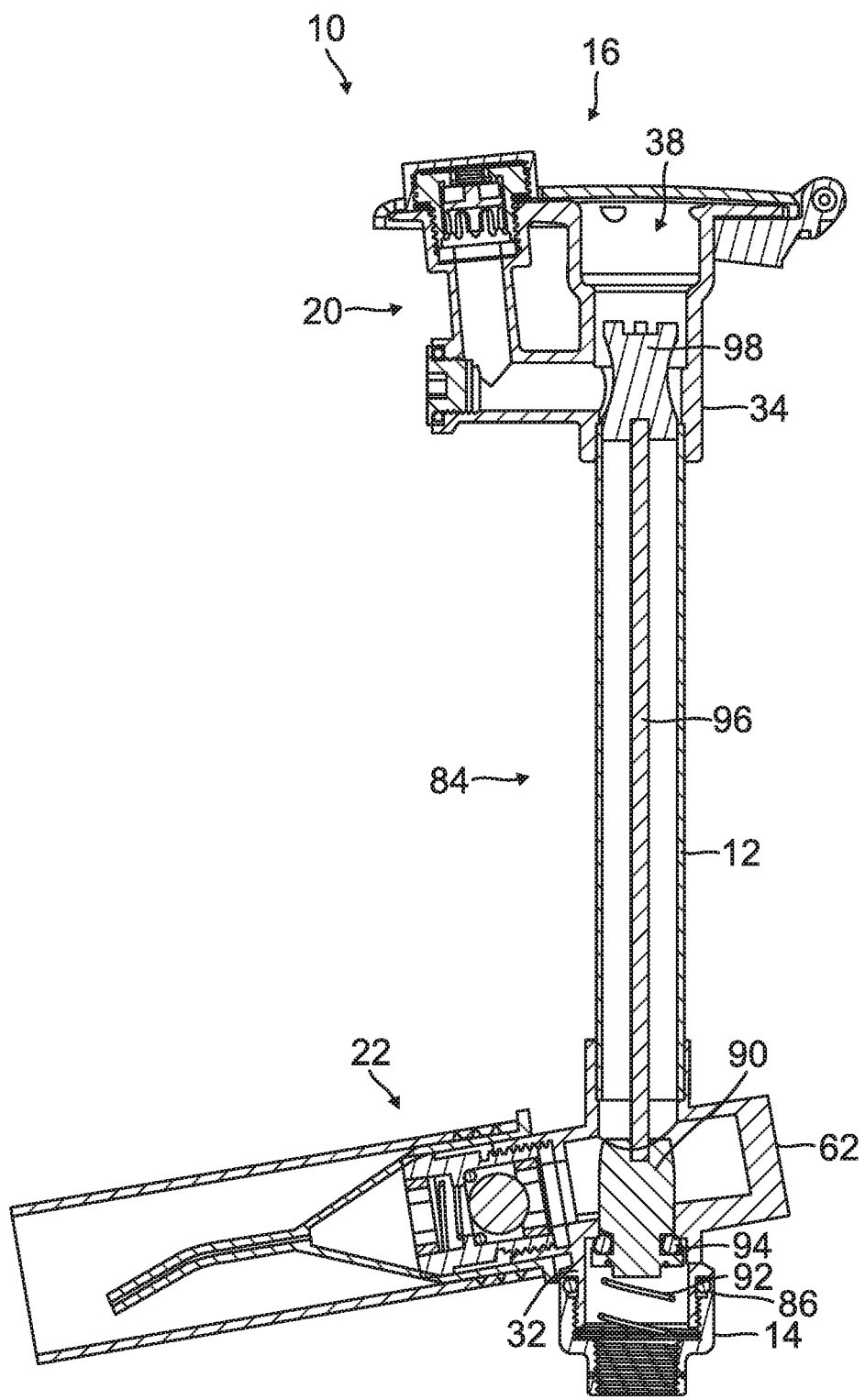
FIG. 4 is a cutaway side view the water valve of FIGS. 1-3 while the water valve is closed, according to an embodiment.

FIG. 4 is a cutaway side view of the water valve 10 of FIGS. 1-3, and of the valve assembly 84 of FIG. 3, in closed positions, according to an embodiment.

The valve assembly 84 includes a valve piston 90, a piston-return spring 92, a piston-sealing ring 94, a connecting rod 96, and a member 98.

While the water valve 10 is closed, the spring 92 (and, if present, water pressure in the pipe 76 (FIG. 2)) urges the piston 90 toward the water cavity 12, and thus urges the piston-sealing ring 94 against an inner seat or surface of the bottom end 32 of the drain assembly 22 (as shown in FIG. 4), such that the piston-sealing ring forms a watertight seal with the end 32.

To open the water valve 10, one opens the cover 44 and inserts a device, such as a water connector or handle (not shown in FIG. 4), into the receptacle 38 to break the watertight seal, and to allow water to flow (from bottom to top in FIG. 4) through the water cavity 12 and out of the receptacle. While one inserts the device, the device pushes the member 98, and thus the connecting rod 96, toward the coupler 14. If one inserts the device with sufficient force, the device pushes against the member 98 and rod 96 with a force sufficient to move the piston 90 and piston-sealing ring 94 away from the bottom end 32 of the drain assembly 22, and thus with a force sufficient to break the watertight seal. Once the watertight seal is broken, water flows from the water pipe 76 and fitting 78 (FIG. 2), through the coupler 14, drain assembly 22, water cavity 12, and bottom end 34 of the face-plate assembly 16, out of the receptacle 38, and through the device. The watertight seal remains broken, and, therefore, the water valve 10 remains open, as long as the device remains engaged with the receptacle 38. The insertion of such a device, and the resulting opening of the water valve 10, is further described below in conjunction with FIGS. 5-7.

Figure 5:
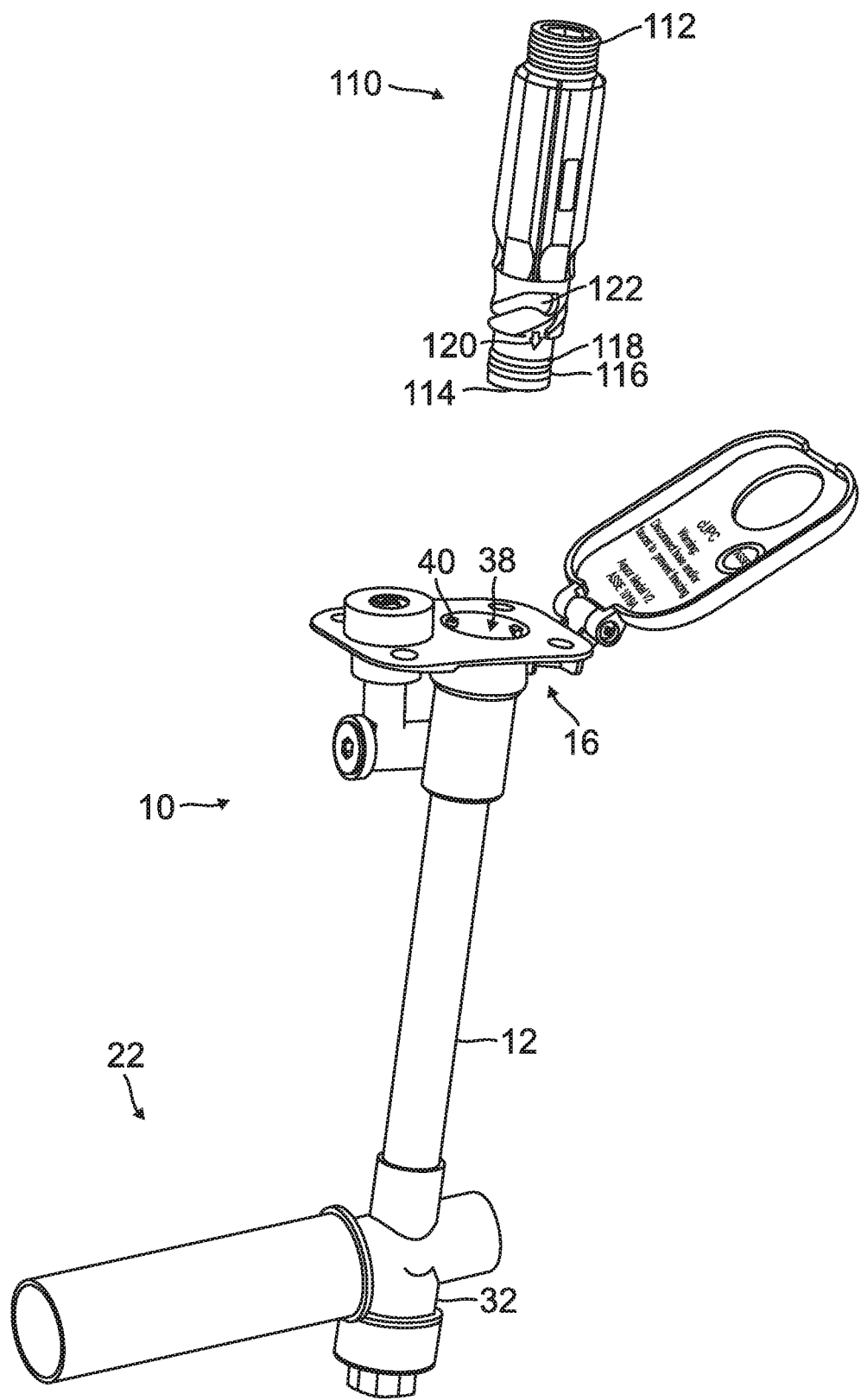
FIG. 5 is an exploded isometric view of the water valve of FIGS. 1-4, and of a water handle configured for attaching to the water valve, according to an embodiment.

FIG. 5 is an exploded view of the water valve 10 of FIGS. 1-4 and of a water-valve-opening-and-water-dispensing device, here a water handle, 110 configured to open the water valve and to dispense water, according to an embodiment.

The water handle 110 includes a threaded top end 112 and a bottom end 114, which includes two sealing rings 116 and 118.

Figures 6A, 6B:
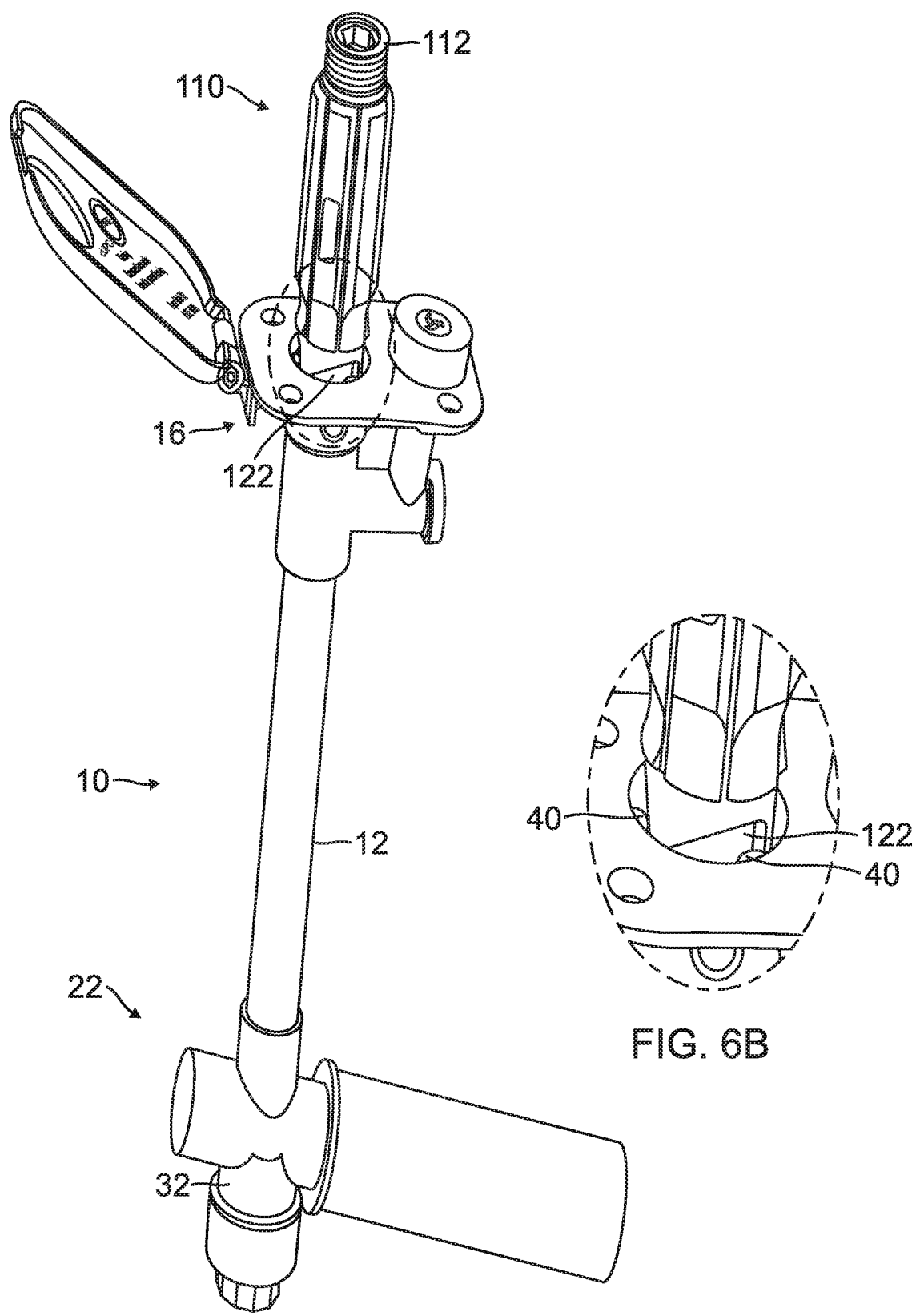
FIG. 6A is a an exploded isometric view of the water valve of FIGS. 1-5, and the water handle of FIG. 5.
FIG. 6B is a magnified view of the coupling between the water valve and the water handle, the views illustrating a procedure for attaching the water handle to the water valve, according to an embodiment.

FIGS. 6A and 6B include views of the water valve 10 and of the water handle 110 while the water handle is partially inserted into the water valve, according to an embodiment.

Figure 7:
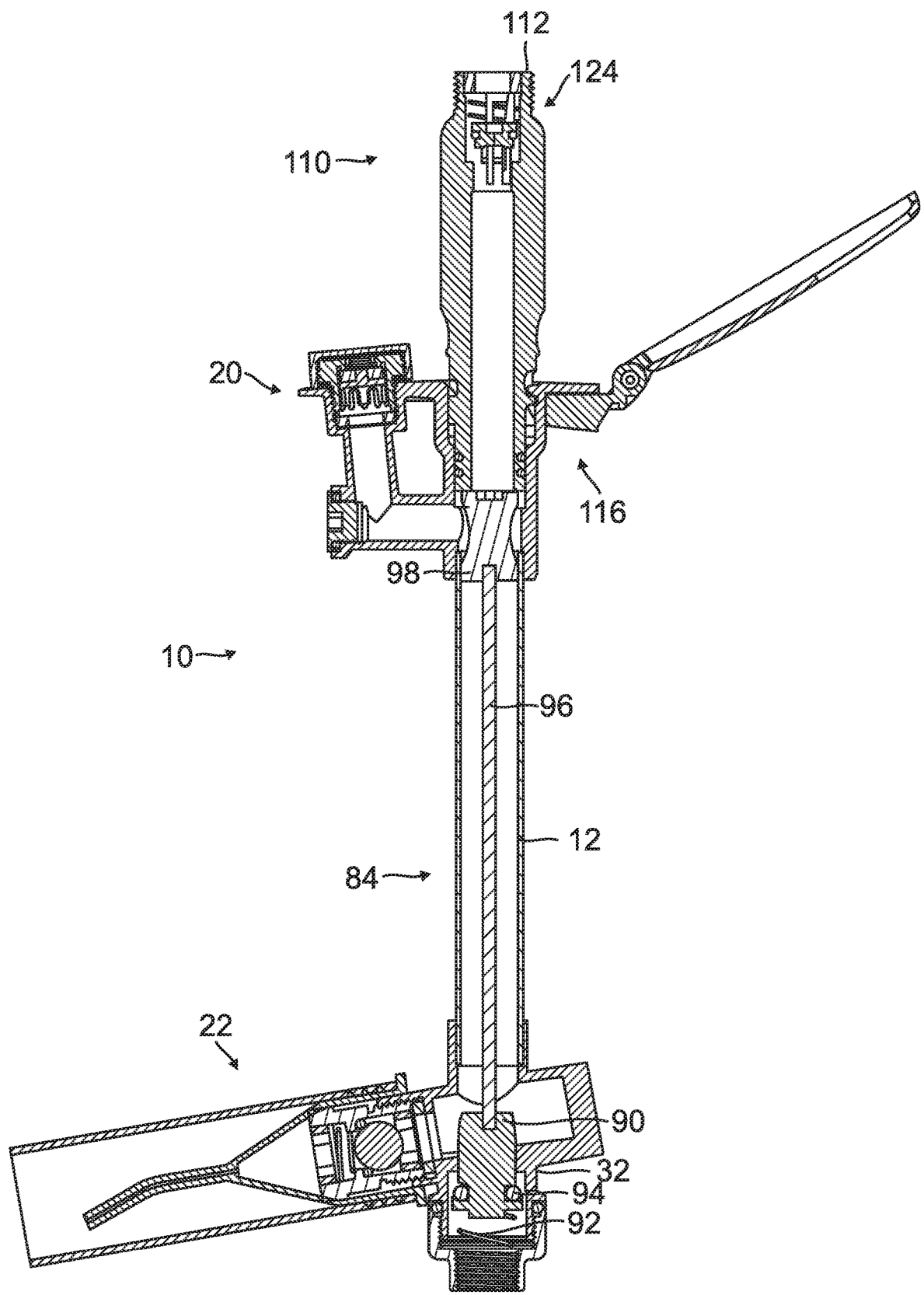
FIG. 7 is a cutaway side view of the water valve of FIGS. 1-6 while the water valve is open, and of the water handle of FIGS. 5-6 while the water handle is attached to the water valve, according to an embodiment.

FIG. 7 is a cutaway side view of the water handle 110 fully inserted in the water valve 10, which is in an open position or state, according to an embodiment.

Referring to FIGS. 5-7, a procedure for inserting the water handle 110 into the water valve 10, and for thereafter dispensing water via the inserted water handle, is described, according to an embodiment.

First, one grasps the water handle 110, and aligns the arrow 120 with one of the protrusions 40 disposed around an inner wall of the receptacle 38.

Next, he/she inserts the bottom end 114 of the water handle 110 into the receptacle 38 and rotates the water handle clockwise. As he/she rotates the water handle 110 clockwise, he/she applies a torque that causes spiral grooves 122 on the outside of the bottom end 114 to engage the protrusions 40 of the face-plate assembly 16. The engagement of the protrusions 40 by the spiral grooves 122 converts the torque being applied to the water handle 110 into a linear force that moves the bottom end 114 of the water handle further into the receptacle 38. If the linear force is strong enough to overcome the opposing force generated by the combination of the piston-return spring 92 and the water pressure from the water pipe 76 and fitting 78 (FIG. 2), then the bottom end 114 of the water handle 110, via the member 98 and the connecting rod 96 of the water-valve assembly 84, pushes the piston 90 and the piston-sealing ring 94 away from the bottom end 32 of the drain assembly 22, and thus breaks the watertight seal between the sealing ring 94 and the bottom end 32. Breaking the watertight seal allows water to flow from the pipe 76, through the fitting 78, drain assembly 22, water cavity 12, and receptacle 38, into the bottom end 114 of the water handle 110, and out from the top end 112 of the water handle. A garden hose, or other water-dispensing tool (not shown in FIGS. 5-7), can be coupled to the top end 112 of the water handle 110 to direct the dispensed water as desired. The two seal rings 116 and 118 form a watertight seal between the interior wall of the receptacle 38 and the bottom end 114 of the water handle 110 such that little or no water leaks from the region between the bottom end 114 and the interior wall of the receptacle 38. The dual sealing rings 116 and 118 also prevent one from being "squirted" or splashed as water flows into the water cavity 12 before the bottom end 114 of the water handle 110 is fully inserted into, and seated within, the receptacle 38.

The water handle 110 can include a valve assembly 124 configured to prevent water from flowing out from the top end 112 of the water handle unless a device (not shown in FIGS. 5-7), such as a garden hose, is attached to the top end 112.

Furthermore, the magnitude of torque required to fully insert the bottom end 114 of the water handle 110 into the receptacle 38 can depend on the number of protrusions 40 and spiral grooves 122 (the number of protrusions typically equals the number of grooves). Generally, the higher the number of protrusions 40 and grooves 122, the lower the magnitude of torque required. It has been determined that three protrusions 40 and three grooves 122 are sufficient to allow a woman of average strength to install the water handle 110 into the receptacle 38 for a typical expected range of residential water pressure (e.g., 138 kilopascals (kPa)–827 kPa, which is equivalent to 20 pounds per square inch (PSI) –120 PSI).

Moreover, once the bottom end 114 of the water handle 110 is fully inserted into the receptacle 38, the protrusions 40 and the spiral grooves 122 are configured to maintain the water handle fully inserted into the receptacle as long as the pressure of the water within the water cavity 12 does not exceed a pressure for which the water valve 10 and water handle are configured.

Still referring to FIGS. 5-7, to remove the water handle 110 and, therefore, to close the water valve 10, one rotates the water handle counterclockwise. The disengagement of the protrusions 40 by the spiral grooves 122 converts the torque being applied to the water handle 110 into a linear force that moves the bottom end 114 of the water handle further out from the receptacle 38; the water pressure in the pipe 76 and fitting 78 (FIG. 2) and the return spring 92 add to this water-handle-removing linear force. Therefore, the bottom end 114 of the water handle 110, via the member 98 and connecting rod 96 of the water-valve assembly 84, releases the piston 90 and the piston-sealing ring 94 such that the water pressure in the pipe 76 and fitting 78 and the piston-return spring 92 urge the piston and the piston-sealing ring toward, and urge the piston-sealing ring against, the bottom end 32 of the drain assembly 22 to re-establish the watertight seal between the piston-sealing ring 94 and the bottom end 32 (see FIG. 4). Furthermore, the dual sealing rings 116 and 118 on the outside of the bottom end 114 of the water handle 110 prevent one from being "squirted" or splashed with water as one disengages the bottom end 114 from the receptacle 38. Without the presence of the two sealing rings 116 and 118, such squirting or splashing could be caused by back water pressure in the garden hose, or other device, attached to the top end 112 of the water handle 110.

After one removes the bottom end 114 of the water handle 110 from the receptacle 38, any water remaining in the water cavity 12 drains out via the drain assembly 22 due to a gravity-induced flow, which draining prevents standing water from forming and freezing inside of the water cavity (the operation of the drain assembly 22 is described below in conjunction with FIGS. 10-12). Furthermore, if the anti-siphon assembly 20 is present, water remaining in the tubes 54 and 56 drains out from the valve assembly 58 due to a gravity-induced flow, which draining prevents standing water from forming and freezing inside of the anti-siphon assembly.

Still referring to FIGS. 5-7, alternate embodiments are contemplated for the water valve 10, the water handle 110, the procedure for inserting the water handle 110 into the receptacle 38, and the procedure for removing the water handle from the receptacle. For example, the water valve 10 can include two, or more than three, protrusions 40, and the water handle 110 (or other device) can include two, or more than three, spiral grooves 122. Furthermore, the grooves 122 can be configured so that one turns the water handle 110 in a counterclockwise direction to insert the water handle into the receptacle 38, and in a clockwise direction to remove the water handle from the receptacle. Moreover, the water handle 110 can be formed from any suitable material such as metal (e.g., stainless steel) or a polymer (e.g., PVC), and can be formed from one material (e.g., PVC) even when the protrusions 40 are formed from another material (e.g., stainless steel).

Figure 8:
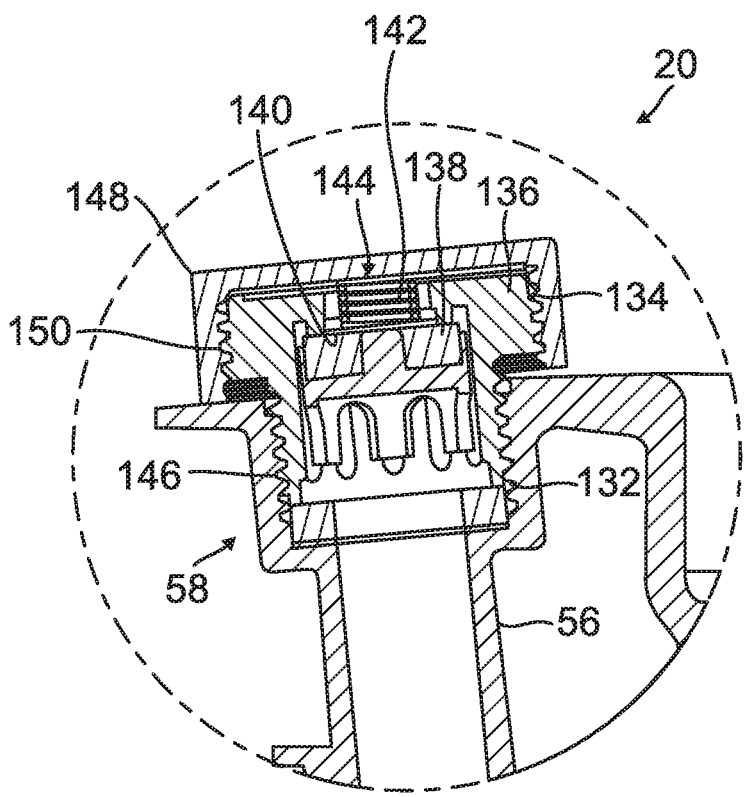
FIG. 8 is a cutaway side view of the anti-siphon assembly of FIGS. 1-7 while the anti-siphon assembly is closed, according to an embodiment.

FIG. 8 is a cutaway side view of the anti-siphon assembly 20 of FIGS. 1-7 with the anti-siphon valve assembly 58 in closed position, according to an embodiment. The anti-siphon valve assembly 58 includes threads 132 and 134, a valve base 136, a water-stop gasket 138, a sealing surface 140, a return spring 142, and a valve opening 144. The threads 132 engage threads 146 of the anti-siphon tube 56 to secure the anti-siphon valve assembly 58 to the water valve 10 (e.g., FIG. 7). The anti-siphon assembly 20 also includes a cover 148 having threads 150, which engage the threads 134 to secure the cover to the valve assembly 58. The valve assembly 58 and its components can be formed from any suitable materials, such as a metal (e.g., stainless steel), a polymer (e.g., PVC), rubber (e.g., the gasket 138 can be formed from rubber or a rubber-like material), and the like.

Figure 9:
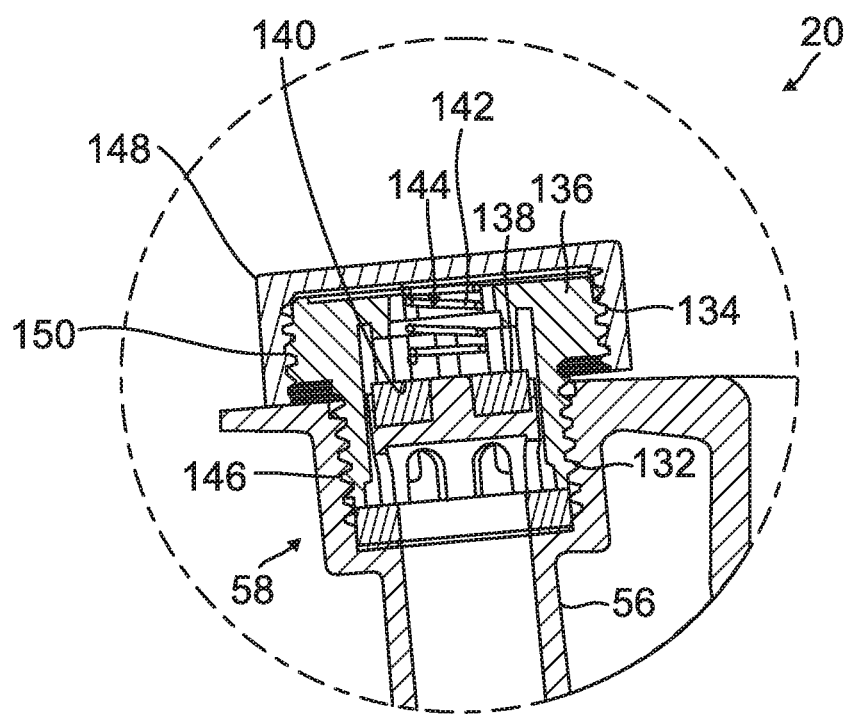
FIG. 9 is a cutaway side view of the anti-siphon assembly of FIGS. 1-8 while the anti-siphon assembly is open, according to an embodiment.

FIG. 9 is a cutaway side view of the anti-siphon assembly 20 of FIGS. 1-8 with the anti-siphon valve assembly 58 in an open position, according to an embodiment.

Referring to FIGS. 7-9, operation of the anti-siphon assembly 20 is described, according to an embodiment.

When the water valve 10 is opened, water fills the tubes 54 and 56. The pressure of the water generates a force sufficient to overcome the force of the spring 142 such that the water pressure forces the water-stop gasket 138 against the sealing surface 140, and thus causes the gasket and sealing surface to form a watertight seal such that no water flows through the valve opening 144 (see FIG. 8).

Under certain conditions, the water pressure in the water cavity 12 (e.g., FIG. 7) can suddenly and momentarily decrease. Such a decrease can be caused, for example, by the opening of one or more other valves in the water-supply-and-distribution system to which the water valve 10 is connected.

Without the anti-siphon assembly 20, this pressure decrease could allow outside water from a reservoir to which the water valve 10 is connected to enter, via the receptacle 38 (e.g., FIG. 7), the water-supply-and-distribution system. Examples of such a reservoir can include a garden hose having an end coupled to the water valve 10 and being filled with water, and a swimming pool, spa, garden, or mud hole in which an opposite end of the garden hose is disposed. The entering of such outside water into the water-supply-and-distribution system is often undesirable because such outside water can carry contaminants, such as dirt, bacteria and other infectious agents, or chemicals.

To prevent outside water from entering the water valve 10 and, therefore, the water-supply-and-distribution system to which the water valve is connected, in response to such a pressure drop, the valve assembly 58 opens to equalize the pressure within the water cavity 12. During this momentary drop in pressure within the water cavity 12, the pressure of the air outside of the valve opening 144 and the return spring 142 generate a force that is sufficient to overcome the force generated by the dropped water pressure, and, therefore, that is sufficient to open the valve assembly 58 by urging the gasket 138 away from the sealing surface 140 to break the watertight seal. In response to the breaking of the watertight seal, air flows through the valve opening 144 to compensate for the momentary pressure drop inside of the water cavity 12 (i.e., to equalize the pressure inside of the water-supply-and-distribution system with the pressure outside of the water-supply-and-distribution system). This pressure compensation prevents outside water from flowing through the water-valve receptacle 38 into the water-supply-and-distribution system. Another way to view the above-described operation is that the momentary drop in water pressure creates a suction that "sucks" in air through the valve assembly 58 instead of "sucking" outside water in through the receptacle 38.

As soon as the water pressure within the water-supply-and-distribution system increases back to normal (i.e., as soon as the pressure difference between the inside water and outside water is equalized), the water pressure in the water cavity 12 and the tubes 54 and 56 increases back to normal.

The increased water pressure generates a force sufficient to overcome the force of the spring 142 and the air outside of the valve opening 144 such that the increased water pressure forces the water-stop gasket 138 against the sealing surface 140, and thus causes the gasket and sealing surface to re-establish a watertight seal such that no water flows through the valve opening.

The valve assembly 58 is configured to repeat the above operation in response to subsequent drops in water pressure within the water-supply-and-distribution system.

Furthermore, as described above, when the water valve 10 is closed by removal of a device such as the water handle 110 (e.g., FIG. 7), water remaining in the water cavity 12 drains out through the drain assembly 22 such that there is no water pressure in the water cavity or in the tubes 54 and 56.

In response to the lack of water pressure, the return spring 142 urges the water-stop gasket 138 away from the sealing surface 140 to break the watertight seal, and thus to open valve assembly 58.

Therefore, any water remaining in the tubes 54 and 56 can drain through the water cavity 12 and drain assembly 22 such that, in the tubes, there remains little or no standing water that could freeze and damage the water valve 10, or that otherwise could reduce the thermal protection that the water valve affords to the water-supply-and-distribution system to which it is connected.

Referring to FIGS. 8-9, alternate embodiments of the anti-siphon assembly 20 are contemplated. For example, the anti-siphon valve assembly 58 can be secured to the tube 56 by means (e.g., adhesive, welding) other than the threads 132 and 146.

Figure 10:
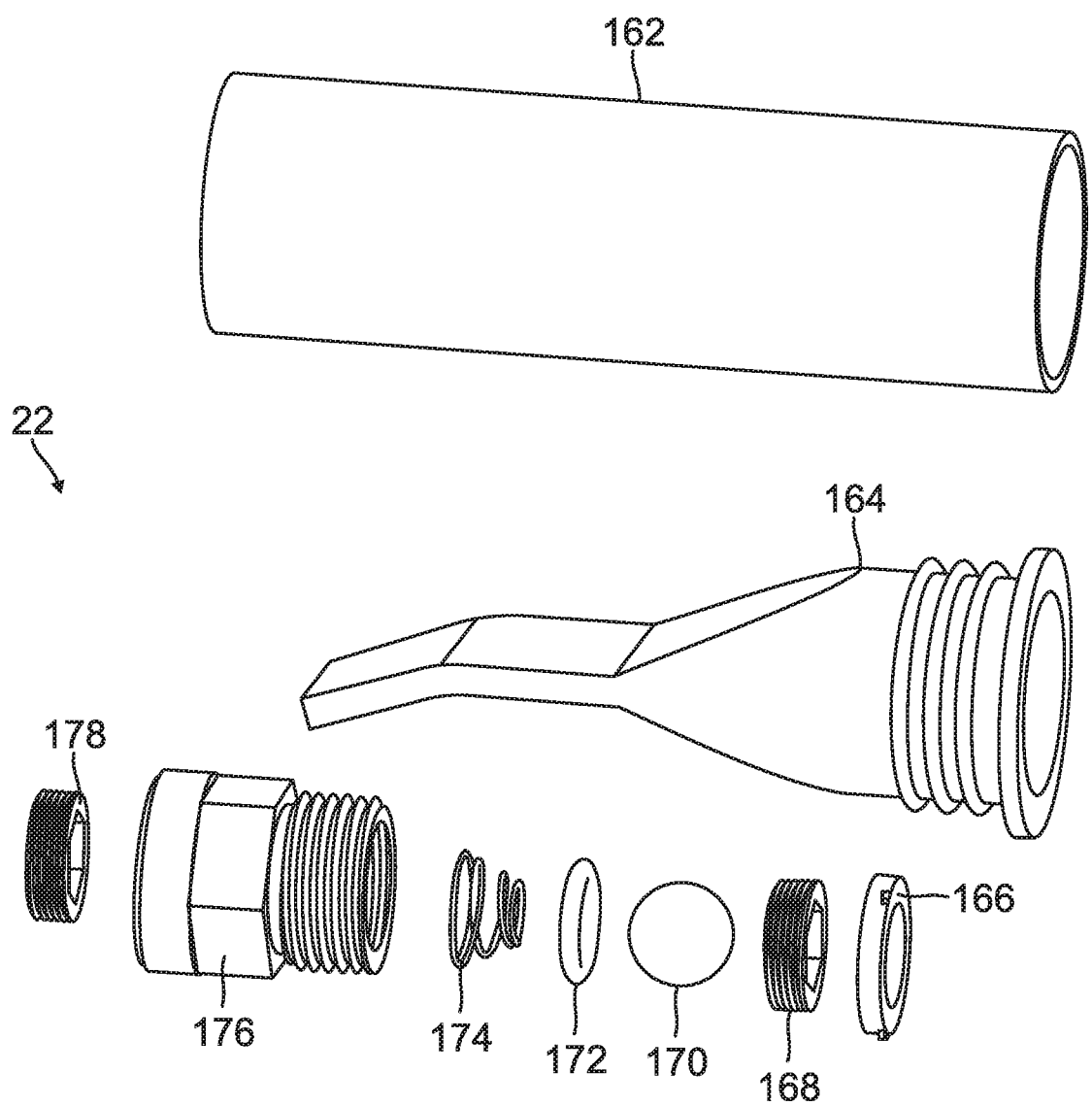
FIG. 10 is an exploded view of the drain assembly of FIGS. 1-7, according to an embodiment.

FIG. 10 is an exploded view of the drain assembly 22 (but for the body 62) of FIGS. 1-7, according to an embodiment.

Figure 11:
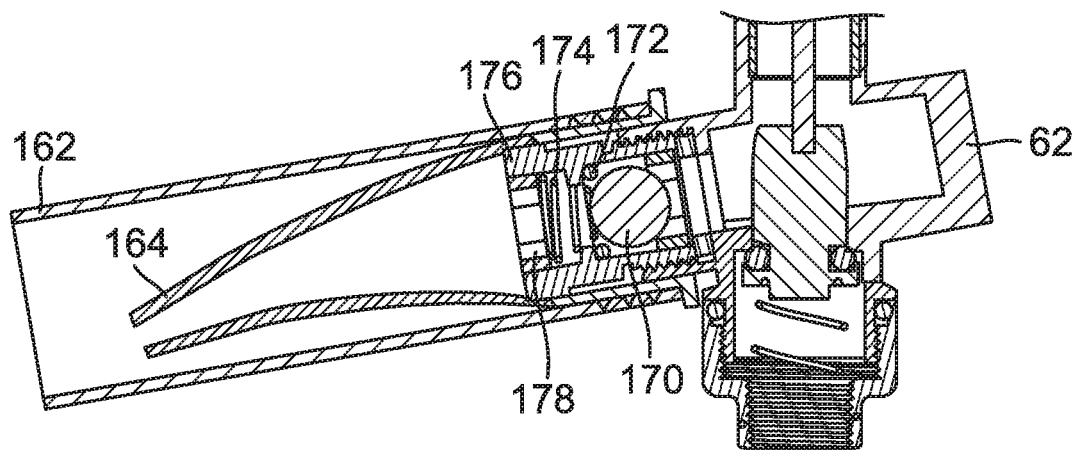
FIG. 11 is a cutaway side view of the drain assembly of FIGS. 1-7 and 10 while the drain assembly is closed, according to an embodiment.

FIG. 11 is a cutaway side view of the drain assembly 22 of FIGS. 1-7 in an open position, according to an embodiment.

Figure 12:
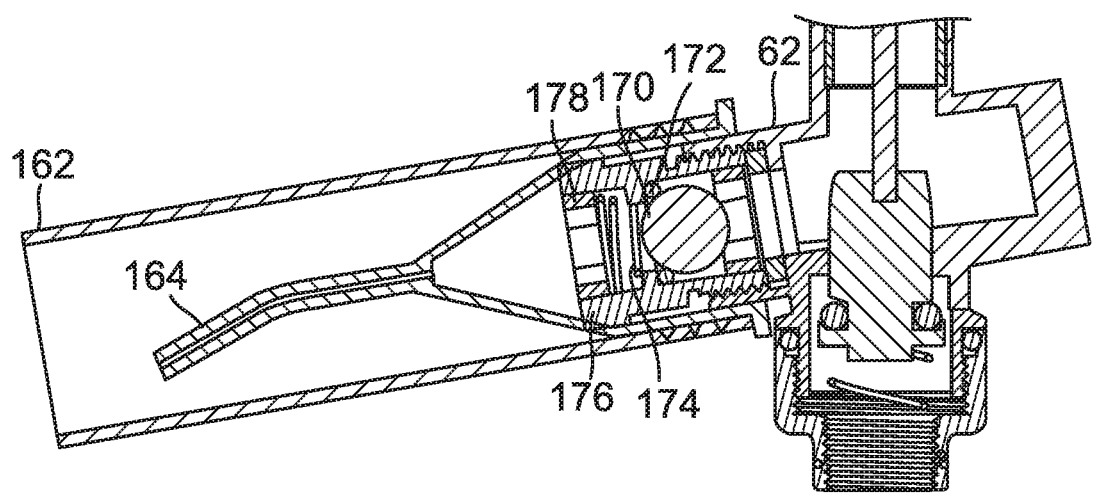
FIG. 12 is a cutaway side view of the drain assembly of FIGS. 1-7 and 10-11 while the drain assembly is open, according to an embodiment.
Figure 17:
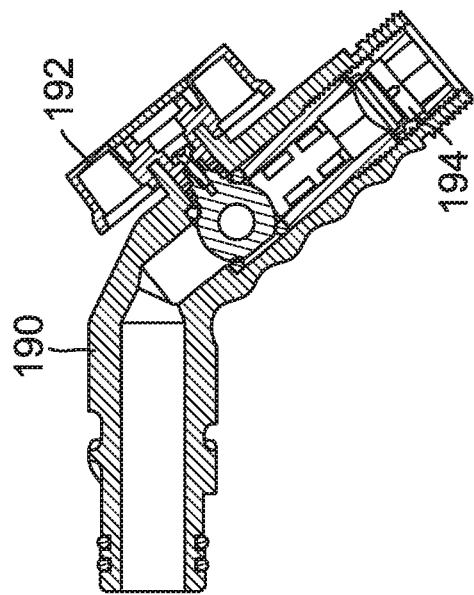
FIGS. 17-20 are respective views of a water spigot configured for attachment to the water valve of FIGS. 1-7, according to an embodiment.
Figure 18:
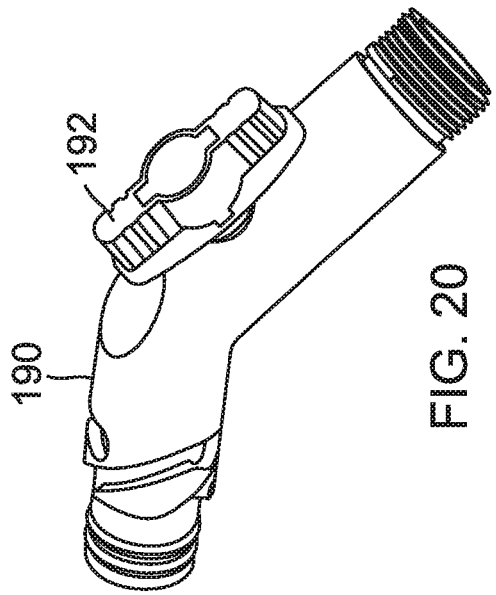
Figure 19:
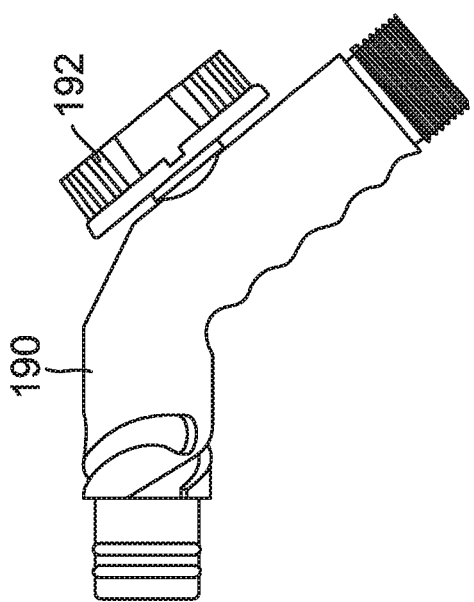
Figure 20:
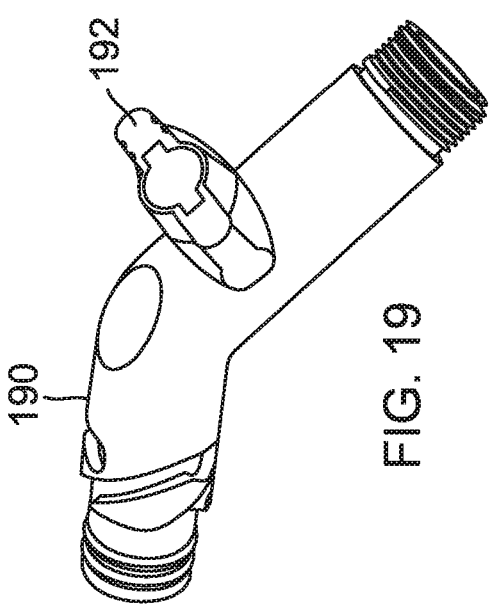

FIG. 12 is a cutaway side view of the drain assembly 22 of FIGS. 1-7 and 11 in a closed position, according to an embodiment.

Referring to FIGS. 10-12, in addition to the body 62, an embodiment of the drain assembly 22 includes a drain tube 162, a drain diaphragm 164, a washer/spacer 166, a first bushing 168 that forms a drain input of the drain assembly, a valve ball 170, a seal 172, a spring 174, a second end piece 176, and a second bushing 178 that forms a drain output of the drain assembly.

The body 62 can be formed integrally with the water cavity 12, and, therefore, can be, and is typically, made from the same material (e.g., stainless steel, PVC) as the water cavity.

The drain tube 162 fits over an end of the second end piece 176 and provides a conduit through which water draining from the water cavity 12 can flow into the support-and-drain region 82 (FIG. 2). The drain tube 162 can be formed from any suitable material such as a plastic (e.g., PVC).

The drain diaphragm 164 fits over the same end of the second end piece 176 as the drain tube 162, is disposed inside of the drain tube, and allows water to drain from the water cavity 12 into the drain tube while preventing debris (e.g., material in the support-and-drain region 82 of FIG. 2) from entering the region of the drain assembly 22 in which the valve ball 170 is disposed. The drain diaphragm 164 can be formed from any suitable material such as a flexible, rubber-like material (e.g., latex).

The washer/spacer 166 receives the first bushing 168, which has an opening in its center to allow water to drain from the water cavity 12. The washer/spacer 166 and bushing 168 can be formed from any suitable material such as metal (e.g., stainless steel) or plastic.

The valve ball 170 can be formed from any suitable material such as metal (e.g., stainless steel) or plastic.

The seal 172 can be, for example, an O-ring, and can be made from any suitable sealing material.

And the end 176 receives the second bushing 178, which has an opening in its center to allow water to drain from the water cavity 12. The end 176 and bushing 178 each can be formed from any suitable material such as metal (e.g., stainless steel) or plastic.

Referring to FIGS. 11-12, operation of the drain assembly 22 is described, according to an embodiment.

Referring to FIG. 11, while the water valve 10 is closed (the seal 94 is urged against the sealing surface at the bottom end 32 of the drain assembly 22 as described above in conjunction with FIG. 4), there is no water pressure inside of the water cavity 12. Therefore, the spring 174 urges the valve ball 170 away from the seal 172 such that any water in the water cavity 12 can drain through the hole in the washer/spacer 166 and first bushing 168, past the valve ball, seal, and spring, through the hole in the end 176 and bushing 178, and out the diaphragm 164 and the drain tube 162 into the support-and-drain region 82 (FIG. 2).

In contrast, referring to FIG. 12, while the water valve 10 is open (the seal 94 is urged away from the sealing surface of the bottom end 32 of the drain assembly 22 as described above in conjunction with FIG. 7), there is significant water pressure inside of the water cavity 12. Therefore, this water pressure overcomes the force of the spring 174, and urges the valve ball 170 against the seal 172 such that the water in the water cavity 12 cannot flow past the water-tight seal that the ball forms with the seal 172.

But after the water valve 10 is closed and the water pressure inside of the water cavity 12 lessens, the spring 174 overcomes the force of the water in the water cavity to urge the valve ball 170 away from the seal 172 so that residual water in the water cavity 12 can drain through the drain assembly 22 as described above in conjunction with FIG. 11.

Referring again to FIGS. 10-12, alternate embodiments of the drain assembly 22 are contemplated. For example, the drain body 62 can be separate from the water cavity 12, and attached to the water cavity in any suitable manner such as by welding, adhesive, or a threaded connection. Furthermore, the drain assembly 22 can have any structure and configuration suitable to allow draining of the cavity 12 while the valve 10 is closed and to form a drain seal while the valve is open and the cavity is pressurized.

FIGS. 13-14 are respective isometric exploded and non-exploded views of the water handle 110 of FIGS. 5-7, a hose, such as a garden hose, 180, and an optional vacuum breaker 182, according to an embodiment. If the water valve 10 (FIGS. 1-7) includes the anti-siphon assembly 20, then the hose 180 can be coupled directly to the water handle 110. If the water valve 10 does not include the anti-siphon assembly 20, then the hose 180 can be coupled to the water handle 110 via the vacuum breaker 182, which, like the anti-siphon assembly, is configured to compensate for a sudden and momentary pressure drop in the water-supply-and-distribution system to which the water valve is connected. The vacuum breaker 182 can have a structure similar to the structure of the anti-siphon assembly 20, and can be configured to operate in a manner similar to the manner in which the anti-siphon assembly operates as described above in conjunction with FIGS. 8-9. For example, the vacuum breaker 162 can include the anti-siphon valve assembly 58 of FIGS. 8-9. Or the vacuum breaker 182 can have a structure different than the structure of the anti-siphon assembly 20, and can be configured to operate in a manner different than the manner in which the anti-siphon assembly operates.

FIGS. 15-16 are respective isometric exploded and non-exploded views of the water handle 110 of FIGS. 5-7, the hose 180 of FIGS. 13-14, and a valve switch 184, according to an embodiment. The hose 180 is configured to be coupled to the water handle 110 via the valve switch 184, which allows one to turn "on" (valve switch open) and "off" (valve switch closed) the water to the hose without connecting and disconnecting the water handle 110 from the water valve 10 (FIGS. 1-7). Optionally, the water handle 110 can incorporate the valve switch 184, or a similar valve.

FIGS. 17-20 are views of a water spigot 190 configured for insertion into the receptacle 38 of the water valve 10 (FIGS. 1-7), according to an embodiment.

Figure 21:
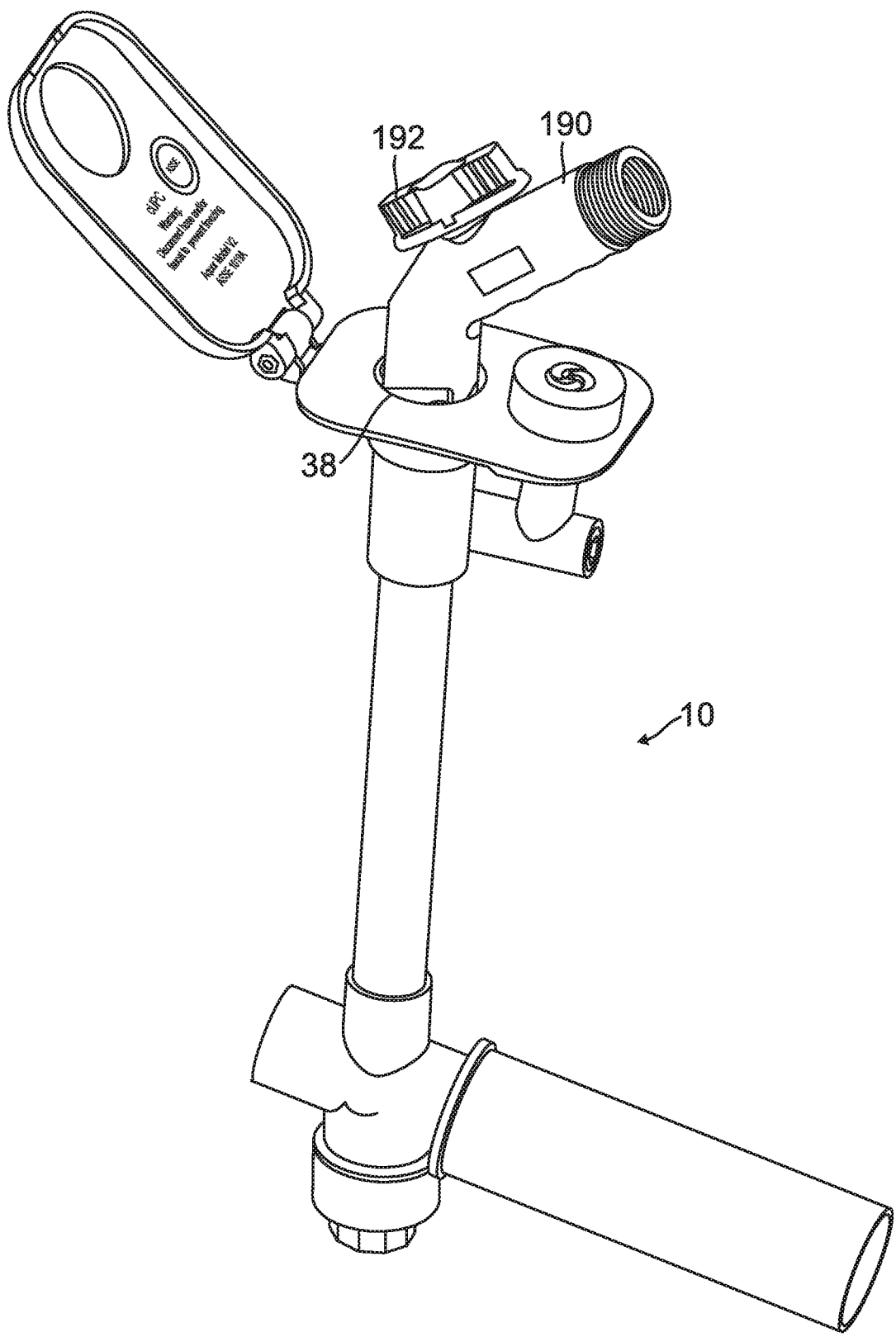
FIG. 21 is an isometric view of the water spigot of FIGS. 17-20 attached to the water valve of FIGS. 1-7, according to an embodiment.

FIG. 21 is a view of the water spigot 190 inserted into the water valve 10, according to an embodiment.

Referring to FIGS. 17-21, installation, use, and removal of the water spigot 190 is described, according to an embodiment.

First, one inserts the water spigot 190 into the receptacle 38 of the water valve 10 in a manner similar to the manner in which he/she inserts the water handle 110 into the receptacle as described above in conjunction with FIGS. 5-7.

Unlike the water handle 110, the water spigot 190, once fully inserted into the receptacle 38, can be angled, like a conventional water spigot, to increase the comfort level of one who is used to a conventional water spigot.

The water spigot 190 can be made from any suitable material such as a metal (e.g., stainless steel) or a polymer (PVC), and can be made from one material (e.g., PVC) even where the water valve 10 is made from another material (e.g., stainless steel).

The water spigot 190 includes a valve switch 192, which is configured to turn "on" and "off" the water flow without inserting the spigot into, and removing the spigot from, the receptacle 38 of the water valve 10.

The water spigot 190 also includes a bubbler, or aerator, 194, which is configured to aerate water as it exits the spigot.

Still referring to FIGS. 17-21, alternate embodiments of the water spigot 190 are contemplated. For example, the valve switch 192, the aerator 194, or both the valve switch and the aerator can be omitted from the water spigot 190.

Figure 22A:
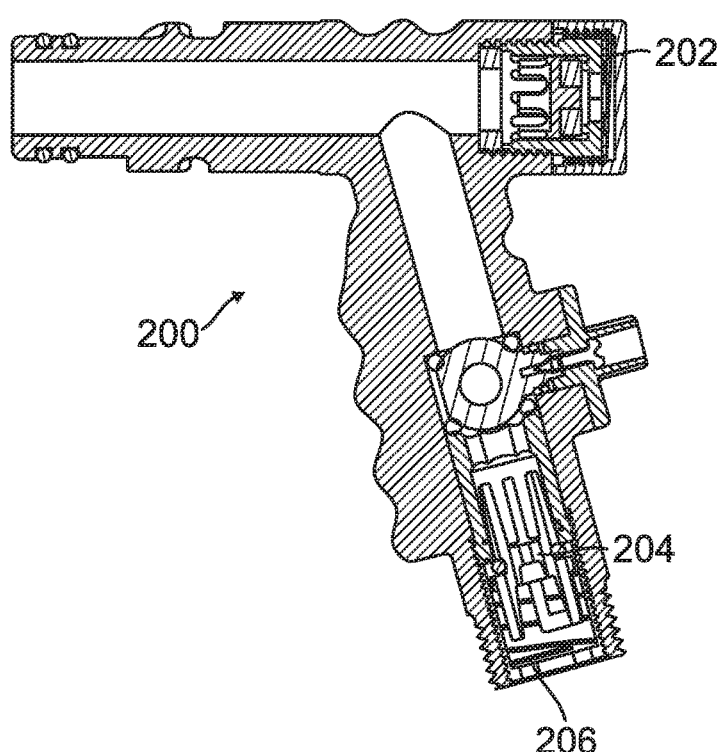
FIGS. 22A-22C are a set of views of a water spigot that includes a check-valve assembly and an anti-siphon assembly, according to an embodiment.
Figure 22B:
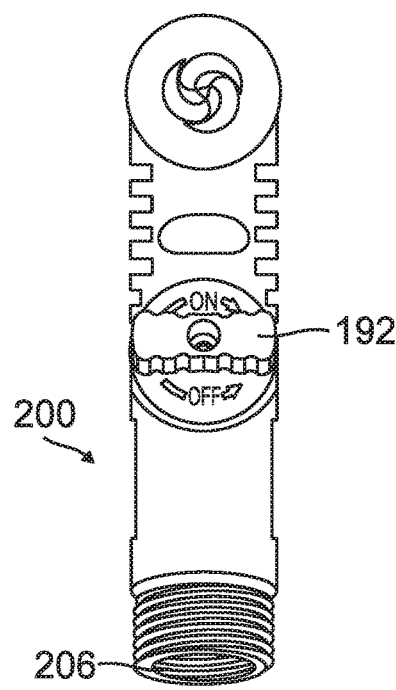
Figure 22C:
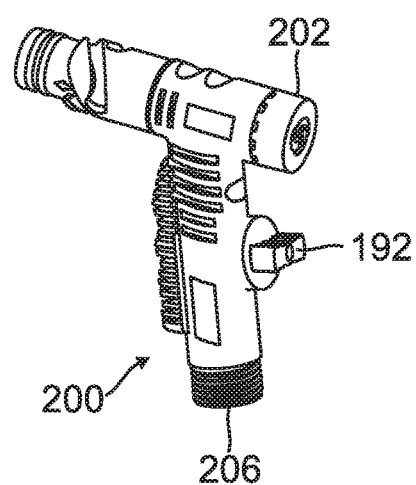

FIGS. 22A-22C are, respectively, a cut-away side view, an end view, and an isometric view of a water spigot 200, according to an embodiment. The water spigot 200 includes an anti-siphon assembly 202 and a check-valve assembly 204, and otherwise can be similar in configuration and operation to the water spigot 190 of FIGS. 17-21. The anti-siphon assembly 202 can be similar in configuration and operation to the anti-siphon assembly 20 of FIGS. 8-9. The check-valve 204 can be any conventional and suitable type of check-valve assembly or check valve, is configured to allow water to flow in only one direction, from the water valve (not shown in FIGS. 22A-22C) out through a dispensing end 206 of the water spigot 200. Therefore, the check-valve assembly 204 is configured to prevent back flow that might otherwise occur in response to a drop in water pressure within the water-supply-and-distribution system to which the water valve 10 (FIGS. 1-7) is connected. In an alternative embodiment, the water spigot 200 includes one, but not both, of the anti-siphon assembly 202 and check-valve assembly 204. Including one or both of the anti-siphon assembly 202 and the check-valve assembly 204 can render the water spigot 200 suitable for use with a water valve (such as the water valve described below in conjunction with FIGS. 23A-23B) that includes no anti-siphon assembly 20. For example, if the building or other code of a municipality requires that a water-supply-and-distribution system include anti-siphon functionality, the water spigot 200 can render the water-supply-and-distribution system code compliant even if used with a water valve that includes no anti-siphon assembly 20.

Figure 23A:
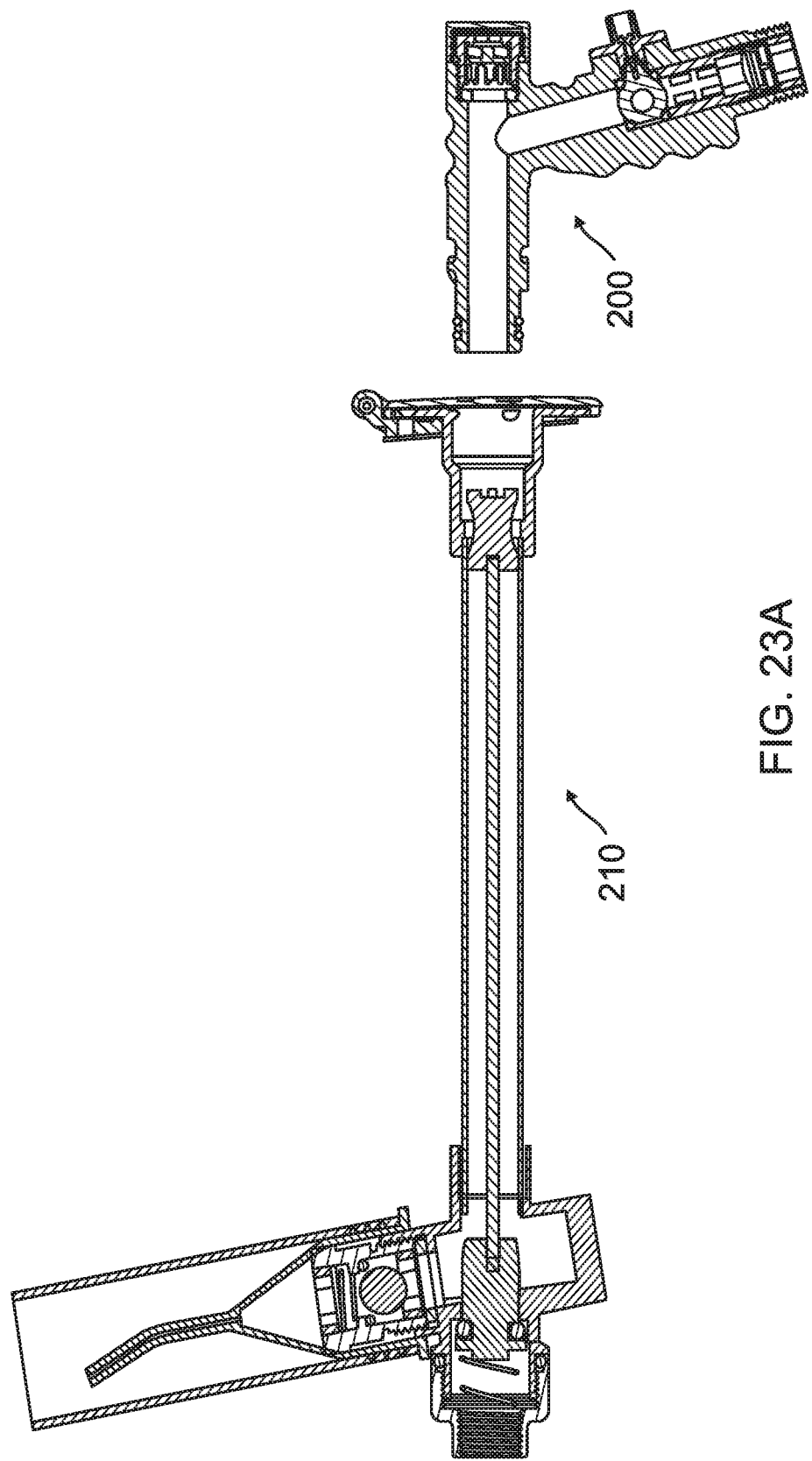
FIGS. 23A-23B are a set of views of the water spigot of FIGS. 22A-22C and a water valve similar to the water valve of FIGS. 1-7 and 21 but lacking an anti-siphon assembly, according to an embodiment.
Figure 23B:
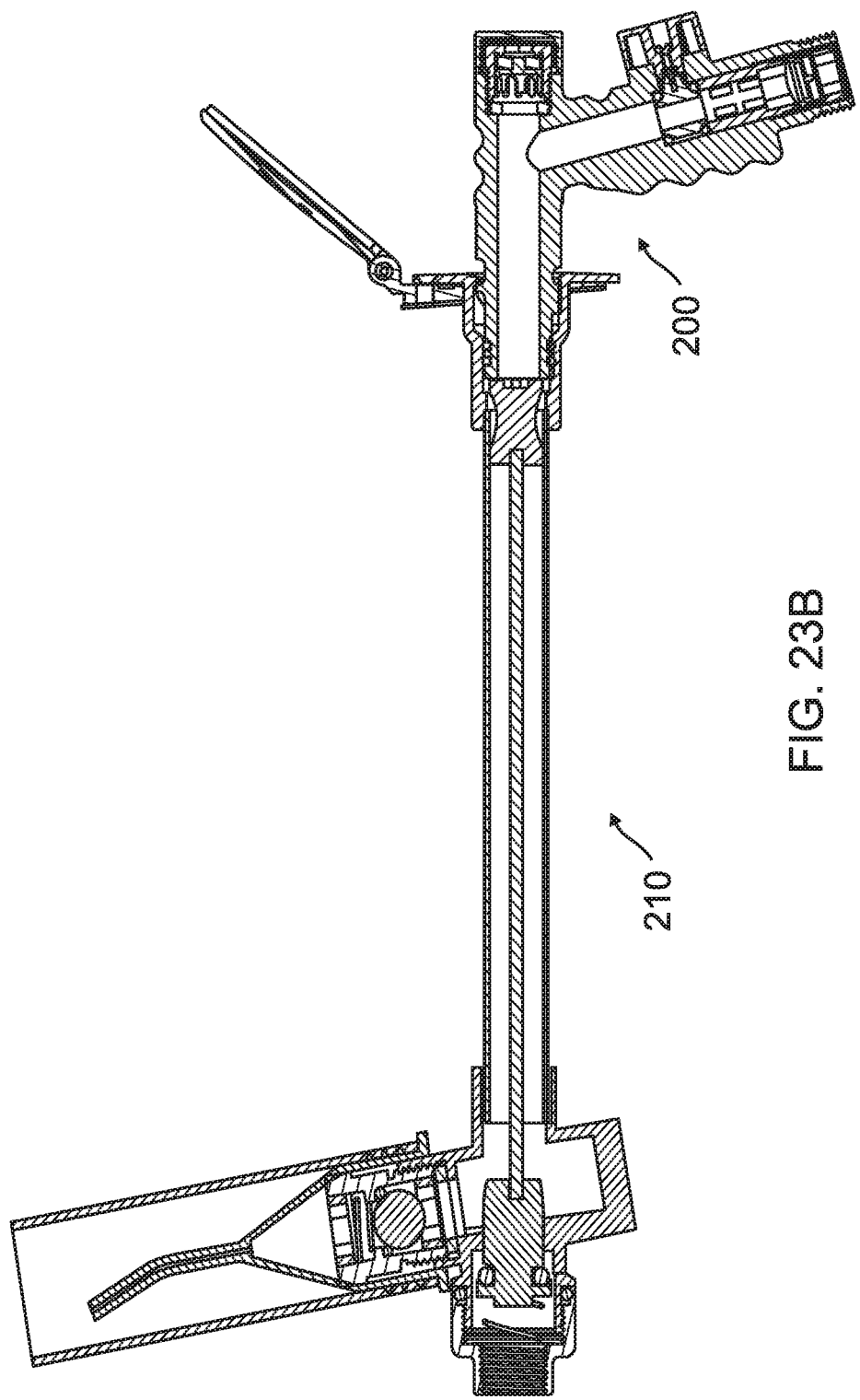

FIGS. 23A-23B are, respectively, an exploded cut-away side view of the water spigot 200 of FIGS. 22A-22C and a closed water valve 210, and a cut-away side view of the water spigot connected to an open water valve 210, according to an embodiment. Other than lacking an anti-siphon assembly 20, the water valve 210 can be similar in configuration and operation to the water valve 10 of FIGS. 1-7 and 21. Because the water valve 210 lacks an anti-siphon assembly, it may be less expensive to manufacture than the water valve 10, and also can be installed through a smaller hole in a ground-based or other surface (as compared to the size of the hole needed to install the water valve 10). And, as described above in conjunction with FIGS. 22A-22C, using the water spigot 200 with the water valve 210 can render the combination of the water spigot and the water valve building-code, or other-code, compliant even though the water valve lacks an anti-siphon assembly.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, one or more components of a described apparatus or system may have been omitted from the description for clarity or another reason. In addition, one or more components of a described apparatus or system that have been included in the description may be omitted from the apparatus or system.

EXAMPLE EMBODIMENTS

Example 1 includes a fluid valve, comprising: a substantially flat face plate; a receptacle disposed in the face plate and having at least one protrusion each configured to engage a respective one of at least one groove of a valve-opening-and-fluid-dispensing device; a cavity having a top end in fluid communication with the receptacle, and having a bottom end; and a drain assembly having a top end in fluid communication with the bottom end of the cavity, having a bottom end, and configured to allow fluid to drain from the cavity in response to the valve-opening-and-fluid-dispensing device being absent from the receptacle.

Example 2 includes the fluid valve of Example 1, further comprising a valve assembly disposed in the cavity and in the drain assembly, including a first sealing ring, configured to form a seal by urging the sealing ring against the bottom end of the drain assembly in response to the valve-opening-and-fluid-dispensing device being absent from the receptacle, and configured to allow fluid to flow into the bottom end of the drain assembly and into the cavity in response to the valve-opening-and-fluid-dispensing device being disposed in the receptacle.

Example 3 includes the fluid valve of any of Examples 1-2 wherein the receptacle has three protrusions that are substantially evenly spaced around the receptacle.

Example 4 includes the fluid valve of any of Examples 2-3 wherein the valve assembly further includes: a piston around which the first sealing ring is disposed; a piston-return spring configured to urge the sealing ring against the bottom end of the drain assembly; a connecting rod having a first end coupled to the piston and having a second end; and a member coupled to the second end of the connecting rod and configured to urge, via the connecting rod and the piston, the sealing ring away from the bottom end of the drain assembly in response to the valve-opening-and-fluid-dispensing device being disposed in the receptacle.

Example 5 includes the fluid valve of any of Examples 1-4 wherein the cavity has a length and is configured to provide a level of thermal isolation between the receptacle and the bottom end of the drain assembly, the level of thermal isolation being related to the length.

Example 6 includes the fluid valve of any of Examples 1-5, further comprising: a threaded coupler rotatably coupleable to the bottom end of the drain assembly; and a second sealing ring configurable to form a seal between an outer side of the bottom end of the drain assembly and an overlapping inner side of the threaded coupler over a range of rotation of the drain assembly relative to the threaded coupler of at least approximately 360°.

Example 7 includes the fluid valve of any of Examples 1-6, further comprising an anti-siphon assembly disposed adjacent to the receptacle and configured to allow fluid in the anti-siphon assembly to drain, due to gravity, out of the anti-siphon assembly and into the cavity in response to the valve-opening-and-fluid-dispensing device being absent from the receptacle.

Example 8 includes the fluid valve of any of Examples 1-7, further comprising an anti-siphon assembly that includes: an anti-siphon opening disposed in the face plate; at least one anti-siphon tube disposed between the anti-siphon opening and the cavity; an anti-siphon valve assembly disposed in the opening, configured to close in response to a pressure inside of the at least one tube being greater than a pressure outside of the at least one tube, and configured to open in response to a pressure inside of the at least one tube being less than a pressure outside of the at least one tube.

Example 9 includes the fluid valve of any of Examples 1-8, further comprising an anti-siphon assembly that includes: an anti-siphon opening disposed in the face plate; at least one anti-siphon tube disposed between the anti-siphon opening and the cavity; and an anti-siphon valve assembly disposed in the opening, having an inner end facing the tube, and having an outer end facing away from the tube, the anti-siphon valve assembly configured to close in response to a pressure at the inner end being greater than a pressure at the outer end, and configured to open in response to a pressure at the inner end being less than a pressure at the outer end.

Example 10 includes the fluid valve of any of Examples 1-9 wherein the drain assembly includes: a sealing ring; a sealing ball; and a spring configured to urge the sealing ball away from the sealing ring in response to the valve-opening-and-fluid-dispensing device being absent from the receptacle, and to allow the sealing ball to form a fluid-tight seal with the sealing ring in response to the valve-opening-and-fluid-dispensing device being disposed in the receptacle.

Example 11 includes a structure, comprising: a water-distribution system; and a water valve coupled to the water-distribution system and including a substantially flat face plate, a receptacle disposed in the face plate and having at least one protrusion each configured to engage a respective at least one groove of a valve-opening-and-fluid-dispensing device, a cavity having a top end in fluid communication with the receptacle, and having a bottom end, and drain assembly having a top end in fluid communication with the bottom end of the cavity, having a bottom end, and configured to allow fluid to drain from the cavity in response to the valve-opening-and-fluid-dispensing device being absent from the receptacle.

Example 12 includes the structure of Example 11, further comprising: a substantially horizontal surface having a hole; and wherein the water valve includes a face-plate assembly having the face plate and having a bottom end in fluid communication with, and disposed between, the receptacle and the cavity, the face plate being mounted to the surface and the bottom end of the face-plate assembly at least partially disposed within the hole.

Example 13 includes the structure of any of Examples 11-12, further comprising: a chamber having a base and a support-and-drain field having an upper surface; and wherein the water valve is disposed substantially vertically in the support-and-drain field over the base such that the face plate is at approximately a same level as, or is at a higher level than, the upper surface of the support-and-drain field.

Example 14 includes a method, comprising engaging each of at least one spiral groove of a valve-opening-and-fluid-dispensing device with a respective protrusion disposed inside of a receptacle of a fluid valve; rotating the valve-opening-and-fluid-dispensing device in a direction that causes the device to move into the receptacle; and in response to the valve-opening-and-fluid-dispensing device moving into the receptacle, forming a fluid-tight seal between a drain output of the fluid valve and the fluid-distribution system.

Example 15 includes the method of Example 14, further comprising in response to the valve-opening-and-fluid-dispensing device moving into the receptacle, breaking a fluid-tight seal between the receptacle and a fluid-distribution system by urging, with a connecting rod, a sealing ring away from a bottom end of a drain assembly of the fluid valve, and Example 16 includes the method of any of Examples 14-15 wherein during the rotating the at least one spiral groove and the at least one respective protrusion convert a torque in the direction of rotation into a force directed into the receptacle.

Example 17 includes a method, comprising rotating a valve-opening-and-fluid-dispensing device in a direction that causes the device to move out from a receptacle of a fluid valve, the device having at least one spiral groove each engaged with a respective protrusion of the receptacle; and in response to the valve-opening-and-fluid-dispensing device moving out from the receptacle, breaking a fluid-tight seal between the receptacle and a drain output of the drain assembly.

Example 18 includes the method of Example 17, further comprising in response to the valve-opening-and-fluid-dispensing device moving out from the receptacle, forming a fluid-tight seal between the receptacle and a fluid-distribution system by reducing a first force with which the device, via a connecting rod, opposes a second force that urges a sealing ring toward a bottom end of a drain assembly of the fluid valve.

Example 19 includes the method of any of Examples 17-18 wherein during the rotating the at least one spiral groove and the at least one respective protrusion convert a torque in the direction of rotation into a force directed out from the receptacle.

Example 20 includes a method, comprising: rotating a threaded end of a drain assembly of a fluid valve relative to a threaded first end of a coupler to achieve an orientation of the fluid valve, a second end of the coupler being connected to a fluid-distribution system, a sealing ring forming a fluid-tight seal between overlapping sides of the threaded end of the drain assembly and the threaded first end of the coupler; and supporting the fluid valve in an achieved orientation.

Example 21 includes the method of Example 20 wherein supporting the fluid valve includes securing a faceplate of the fluid valve to an approximately horizontal surface.

Example 22 includes the method of any of Examples 20-21 wherein supporting the fluid valve includes filling a chamber in which the fluid valve is installed with a water-permeable material.

Example 23 includes a fluid valve, comprising: a substantially flat face plate; a receptacle disposed in the face plate and having at least one protrusion each configured to engage a respective one of at least one groove of a valve-opening-and-fluid-dispensing device; a cavity having a top end in fluid communication with the receptacle, and having a bottom end; and a drain assembly having a top end in fluid communication with the bottom end of the cavity, having a bottom end including a sealing surface, having a drain output, having a sealing ball, having a first sealing ring, and configured to break a drain seal between the drain output and the cavity by urging the sealing ball away from the first sealing ring with a drain-opening force that is greater than an opposing drain-closing force.

Example 24 includes the fluid valve of Example 23, further comprising a valve assembly disposed in the cavity and in the drain assembly, including a second sealing ring, and configured to break a flow seal by urging the second sealing ring away from the sealing surface with a valve-opening force that is greater than an opposing valve-closing force.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited by the claims and the equivalents thereof.

What is claimed is:

1. A fluid valve, comprising: a face plate; a receptacle disposed in the face plate, having at least one protrusion each configured to engage a respective one of at least one groove of a valve opening-and fluid dispensing device; a cavity having a top end in fluid communication with the receptacle, and having a bottom end; a fluid inlet; a valve assembly disposed in the cavity and configured to form a seal between the fluid inlet and the receptacle in response to the valve-opening-and-fluid-dispensing device being absent from the receptacle and to break the seal in response to the valve-opening-and-fluid-dispensing device being disposed in the receptacle; and a drain valve assembly having a top end in fluid communication with the bottom end of the cavity, having a bottom end, and configured to allow fluid to drain from the bottom end of the cavity in response to the valve opening and fluid dispensing device being absent from the receptacle.

2. The fluid valve of claim 1 wherein the valve assembly is disposed in the cavity and in the drain valve assembly, includes a first sealing ring, is configured to form the seal by urging the sealing ring against the bottom end of the drain valve assembly in response to the valve opening-and fluid dispensing device being absent from the receptacle, and configured to break the seal to allow fluid to flow from the fluid inlet, into the bottom end of the drain valve assembly, and into the cavity in response to the valve opening-and fluid dispensing device being disposed in the receptacle.

3. The fluid valve of claim 1 wherein the receptacle has three protrusions that are substantially evenly spaced around the receptacle.

4. The fluid valve of claim 2 wherein the valve assembly further includes: a piston around which the first sealing ring is disposed; a piston return spring configured to urge the sealing ring against the bottom end of the drain valve assembly; a connecting rod having a first end coupled to the piston and having a second end; and a member coupled to the second end of the connecting rod and configured to urge, via the connecting rod and the piston, the sealing ring away from the bottom end of the drain valve assembly in response to the valve opening-and fluid dispensing device being disposed in the receptacle.

5. The fluid valve of claim 1 wherein the cavity has a length and is configured to provide a level of thermal isolation between the receptacle and the bottom end of the drain valve assembly, the level of thermal isolation being related to the length.

6. The fluid valve of claim 1, further comprising: a threaded coupler rotatably coupleable to the bottom end of the drain valve assembly; and a second sealing ring configurable to form a seal between an outer side of the bottom end of the drain valve assembly and an overlapping inner side of the threaded coupler over a range of rotation of the drain valve assembly relative to the threaded coupler of at least approximately 360°.

7. The fluid valve of claim 1, further comprising an anti-siphon assembly disposed adjacent to the receptacle and configured to allow fluid in the anti-siphon assembly to drain, due to gravity, out of the anti-siphon assembly and into the cavity in response to the valve-opening-and-fluid-dispensing device being absent from the receptacle.

8. The fluid valve of claim 1, further comprising an anti-siphon assembly that includes:
an anti-siphon opening disposed in the face plate;
at least one anti-siphon tube disposed between the anti-siphon opening and the cavity;
an anti-siphon valve assembly disposed in the opening, configured to close in response to a pressure inside of the at least one tube being greater than a pressure outside of the at least one tube, and configured to open in response to a pressure inside of the at least one tube being less than a pressure outside of the at least one tube.

9. The fluid valve of claim 1, further comprising an anti-siphon assembly that includes:
an anti-siphon opening disposed in the face plate;
at least one anti-siphon tube disposed between the anti-siphon opening and the cavity; and
an anti-siphon valve assembly disposed in the opening, having an inner end facing the tube, and having an outer end facing away from the tube, the anti-siphon valve assembly configured to close in response to a pressure at the inner end being greater than a pressure at the outer end, and configured to open in response to a pressure at the inner end being less than a pressure at the outer end.

10. The fluid valve of claim 1 wherein the drain valve assembly includes: a sealing ring; a sealing ball; and a spring configured to urge the sealing ball away from the sealing ring in response to the valve opening and fluid dispensing device being absent from the receptacle, and to allow the sealing ball to form a fluid tight seal with the sealing ring in response to the valve opening-and fluid dispensing device being disposed in the receptacle.

11. A structure, comprising: a water distribution system; and a water valve coupled to the water distribution system and including a face plate, a receptacle disposed in the face plate, having at least one protrusion each configured to engage a respective at least one groove of a valve opening-and fluid dispensing device, and configured to dispense a fluid, a cavity having a top end in fluid communication with the receptacle, and having a bottom end, a fluid inlet, a valve assembly disposed in the cavity and configured to form a seal between the fluid inlet and the receptacle in response to the valve-opening-and-fluid-dispensing device being absent from the receptacle and to break the seal in response to the valve-opening-and-fluid-dispensing device being disposed in the receptacle; and a drain valve assembly having a top end in fluid communication with the bottom end of the cavity, having a bottom end in fluid communication with the fluid inlet, and configured to allow fluid to drain from the bottom end of the cavity in response to the valve opening and fluid dispensing device being absent from the receptacle.

12. The structure of claim 11, further comprising:
a substantially horizontal surface having a hole; and
wherein the water valve includes a face-plate assembly having the face plate and having a bottom end in fluid communication with, and disposed between, the receptacle and the cavity, the face plate being mounted to the surface and the bottom end of the face-plate assembly at least partially disposed within the hole.

13. The structure of claim 11, further comprising:
a chamber having a base and a support-and-drain field having an upper surface; and
wherein the water valve is disposed substantially vertically in the support-and-drain field over the base such that the face plate is at approximately a same level as, or is at a higher level than, the upper surface of the support-and-drain field.

14. A method, comprising: engaging each of at least one spiral groove of a valve opening-and fluid dispensing device with a respective protrusion disposed inside of a receptacle of a fluid valve; rotating the valve opening-and fluid dispensing device in a direction that causes the device to move into the receptacle; and in response to the valve opening-and fluid dispensing device moving into the receptacle, opening a valve assembly to allow a fluid from a fluid-distribution system to flow into a fluid inlet of the fluid valve, from the fluid inlet toward the receptacle, and out from the valve-opening-and-fluid-dispensing device, and closing a drain valve assembly to form a fluid tight seal between a drain output of the fluid valve and the fluid distribution system.

15. The method of claim 14 wherein opening the valve assembly comprises breaking a fluid-tight seal between the receptacle and the fluid distribution system by urging, with a connecting rod, a sealing ring away from a bottom end of the drain valve assembly that includes the drain output.

16. The method of claim 14 wherein, during the rotating, the at least one spiral groove and the at least one respective protrusion convert a torque in the direction of rotation into a force directed into the receptacle.

17. A method, comprising rotating a valve opening-and fluid dispensing device in a direction that causes the device to move out from a receptacle of a fluid valve, the device having at least one spiral groove each engaged with a respective protrusion of the receptacle; and in response to the valve opening-and fluid dispensing device moving out from the receptacle closing a valve assembly to prevent a fluid from a fluid-distribution system from flowing from a fluid inlet of the fluid valve toward the receptacle, and opening a drain valve assembly attached to the fluid inlet to break a fluid tight seal between the receptacle and a drain output of the drain valve assembly.

18. The method of claim 17 wherein closing the valve assembly comprises forming a fluid-tight seal between the receptacle and the fluid distribution system by reducing a first force with which the valve-opening-and-fluid-dispensing device, via a connecting rod, opposes a second force that urges a sealing ring toward a bottom end of the drain valve assembly.

19. The method of claim 17 wherein during the rotating the at least one spiral groove and the at least one respective protrusion convert a torque in the direction of rotation into a force directed out from the receptacle.

20. A fluid valve, comprising: a face plate; a receptacle disposed in the face plate, having at least one protrusion each configured to engage a respective one of at least one groove of a valve opening-and fluid dispensing device, and configured to output a fluid; a cavity having a top end in fluid communication with the receptacle, and having a bottom end; a fluid inlet; a valve assembly disposed in the cavity and configured to form a seal between the fluid inlet and the receptacle in response to the valve-opening-and-fluid-dispensing device being absent from the receptacle and to break the seal in response to the valve-opening-and-fluid-dispensing device being disposed in the receptacle; and a drain valve assembly having a top end in fluid communication with the bottom end of the cavity, having a bottom end including a sealing surface and coupled to the fluid inlet, having a drain output, having a sealing ball, having a sealing ring, and configured to break a drain seal between the drain output and the cavity by urging the sealing ball away from the sealing ring with a drain opening force that is greater than an opposing drain closing force.

21. A fluid valve, comprising: a face plate; a receptacle disposed in the face plate and having at least one protrusion each configured to engage a respective one of at least one groove of a valve opening-and fluid dispensing device; a cavity having a top end in fluid communication with the receptacle, and having a bottom end; a drain assembly having a top end in fluid communication with the bottom end of the cavity, having a bottom end including a sealing surface, having a drain output, having a sealing ball, having a first sealing ring, and configured to break a drain seal between the drain output and the cavity by urging the sealing ball away from the first sealing ring with a drain opening force that is greater than an opposing drain closing force; and a valve assembly disposed in the cavity and in the drain assembly, including a second sealing ring, and configured to break a flow seal by urging the second sealing ring away from the sealing surface with a valve opening force that is greater than an opposing valve closing force.

* * * * *

UNITED STATES PATENT AND TRADEMARK OFFICE
CERTIFICATE OF CORRECTION

| | |
|---|---|
| PATENT NO. | : 11,186,970 B2 |
| APPLICATION NO. | : 15/940647 |
| DATED | : November 30, 2021 |
| INVENTOR(S) | : Richard O. Walcome |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 330 days.

Signed and Sealed this
Thirty-first Day of January, 2023

*Katherine Kelly Vidal*

Katherine Kelly Vidal
*Director of the United States Patent and Trademark Office*